United States Patent [19]

Twiss

[11] 4,145,576

[45] Mar. 20, 1979

[54] DTMF AND ROTARY DIAL SIGNAL RECEIVER

[75] Inventor: Frank Twiss, Issaquah, Wash.

[73] Assignee: Tel-Tone Corporation, Kirkland, Wash.

[21] Appl. No.: 816,008

[22] Filed: Jul. 15, 1977

[51] Int. Cl.² .......................................... H04M 1/50
[52] U.S. Cl. .......................... 179/16 EC; 179/84 VF
[58] Field of Search ............. 179/16 R, 16 A, 16 AA, 179/16 EC, 84 VF

[56] References Cited

U.S. PATENT DOCUMENTS

| | | | |
|---|---|---|---|
| 3,772,476 | 11/1973 | Busch | 179/18 EB |
| 3,845,249 | 10/1974 | Sellari, Jr. et al. | 179/84 VF |
| 3,851,110 | 11/1974 | Kelly et al. | 179/18 EB |
| 3,851,112 | 11/1974 | Kusan | 179/84 VF |
| 3,912,869 | 10/1975 | Ullakko | 179/84 VF |
| 3,917,913 | 11/1975 | Patten | 179/16 EC |
| 4,044,206 | 8/1977 | Champan et al. | 179/84 VF |
| 4,066,846 | 1/1978 | Champan et al. | 179/84 VF |

*Primary Examiner*—William C. Cooper
*Assistant Examiner*—Randall P. Myers
*Attorney, Agent, or Firm*—Christensen, O'Connor, Johnson & Kindness

[57] ABSTRACT

A dial signal receiver for receiving and decoding telephone digit signals in either dual-tone multifrequency (DTMF) or rotary dial pulse form is disclosed. DTMF digits are accepted, if, simultaneously, both the high and low frequency components, derived from a band-split filter, repetitively pass a short term check; and each component passes a long term check once. The short term checks comprise repetitively measuring the period of two consecutive cycles of each component of the input signal. The long term check comprises measuring the period of a number of cycles of each component of the input signal. The number of cycles for each component is dependent on the nominal frequency determined by the short term check of that component. At the end of a cycle related period, a "window" is opened for a time interval related to the expected frequency, as determined by the short term check. If a short term check pulse occurs during the open window period, the related component is accpeted as valid. Rotary dial pulses are accepted as valid if they establish a break in loop current lasting at least a predetermined time period (e.g., 27 ms) followed by a restoration of loop current for at least a predetermined time period (e.g., 9 ms). A main controller controls whether or not DTMF or rotary dial pulse circuits, or both, will be conditioned to accept their related signals, based on externally applied control voltages. An output register and decoder stores data bits related to accepted DTMF and/or rotary dial pulses.

45 Claims, 18 Drawing Figures

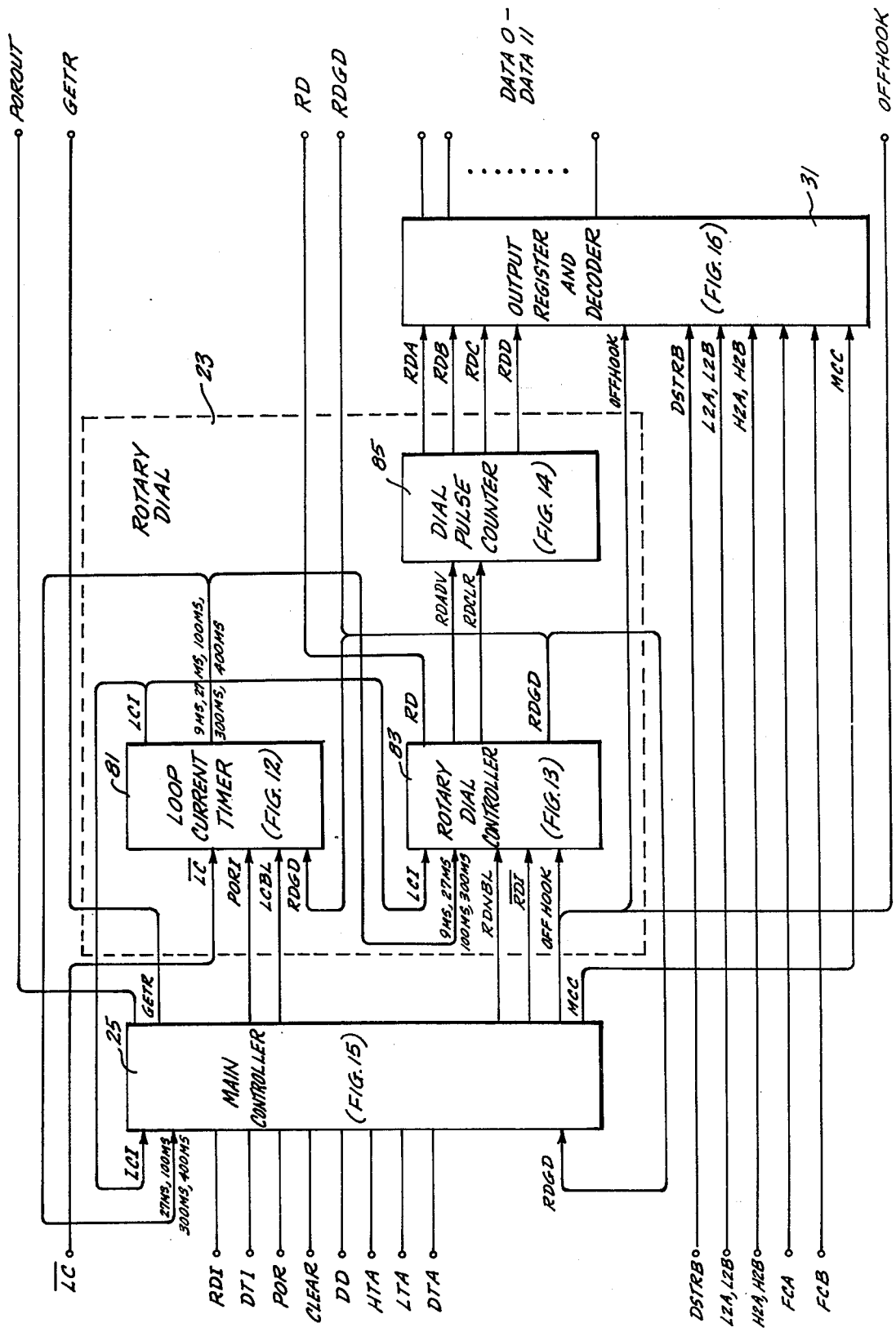

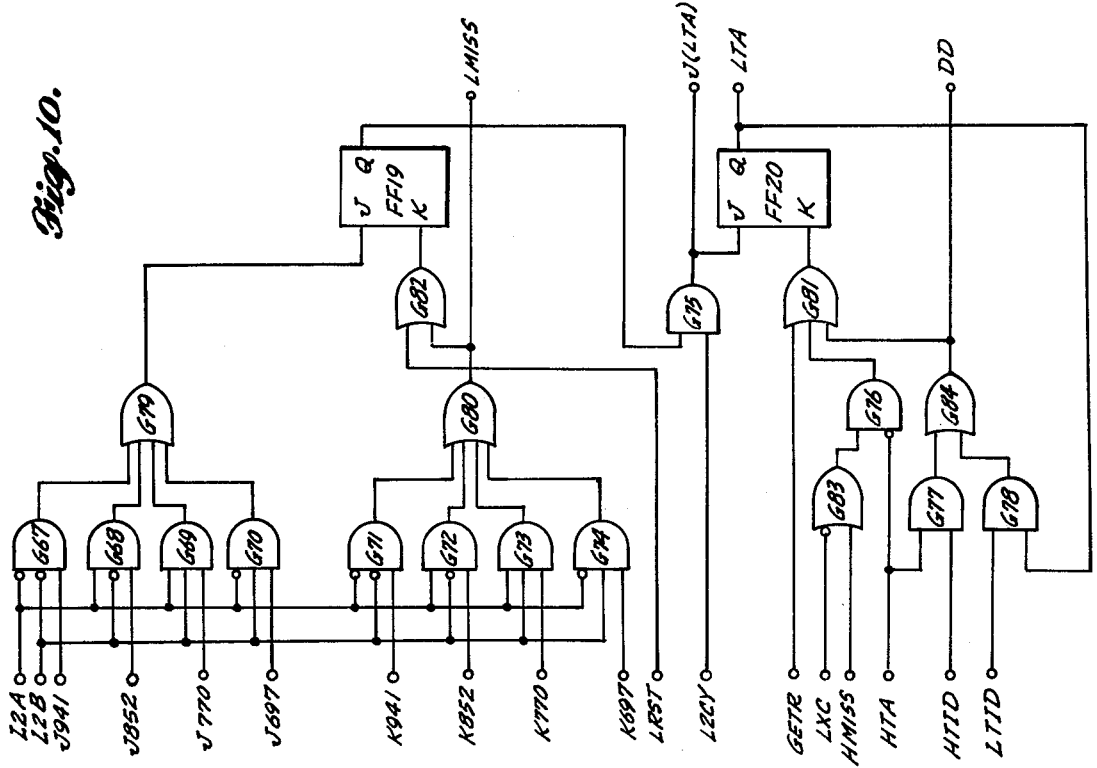
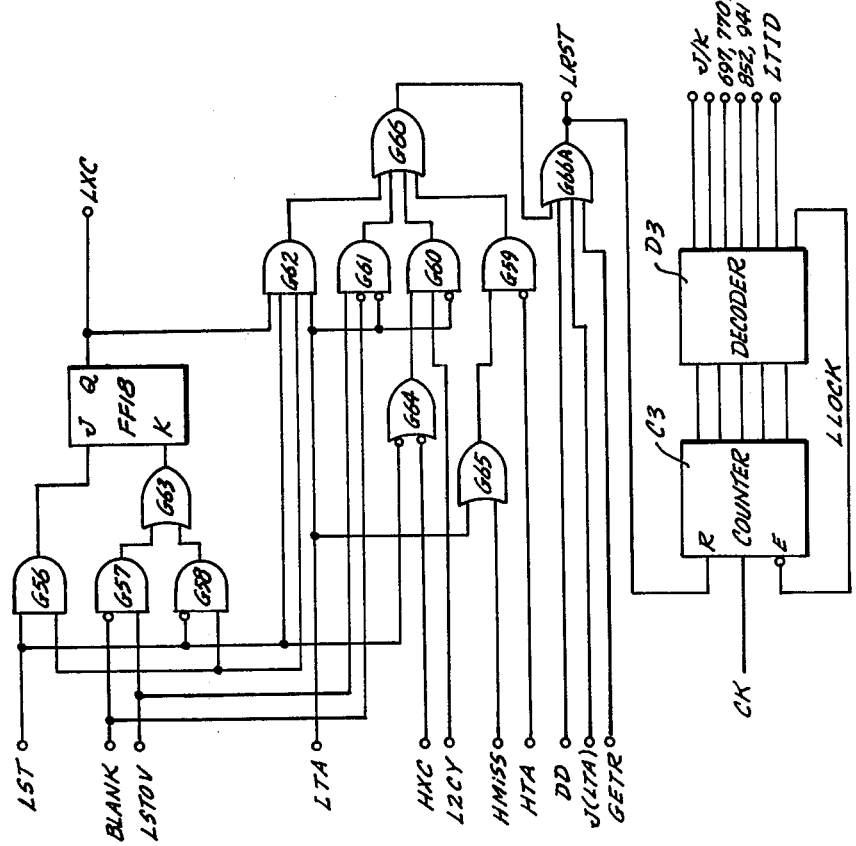

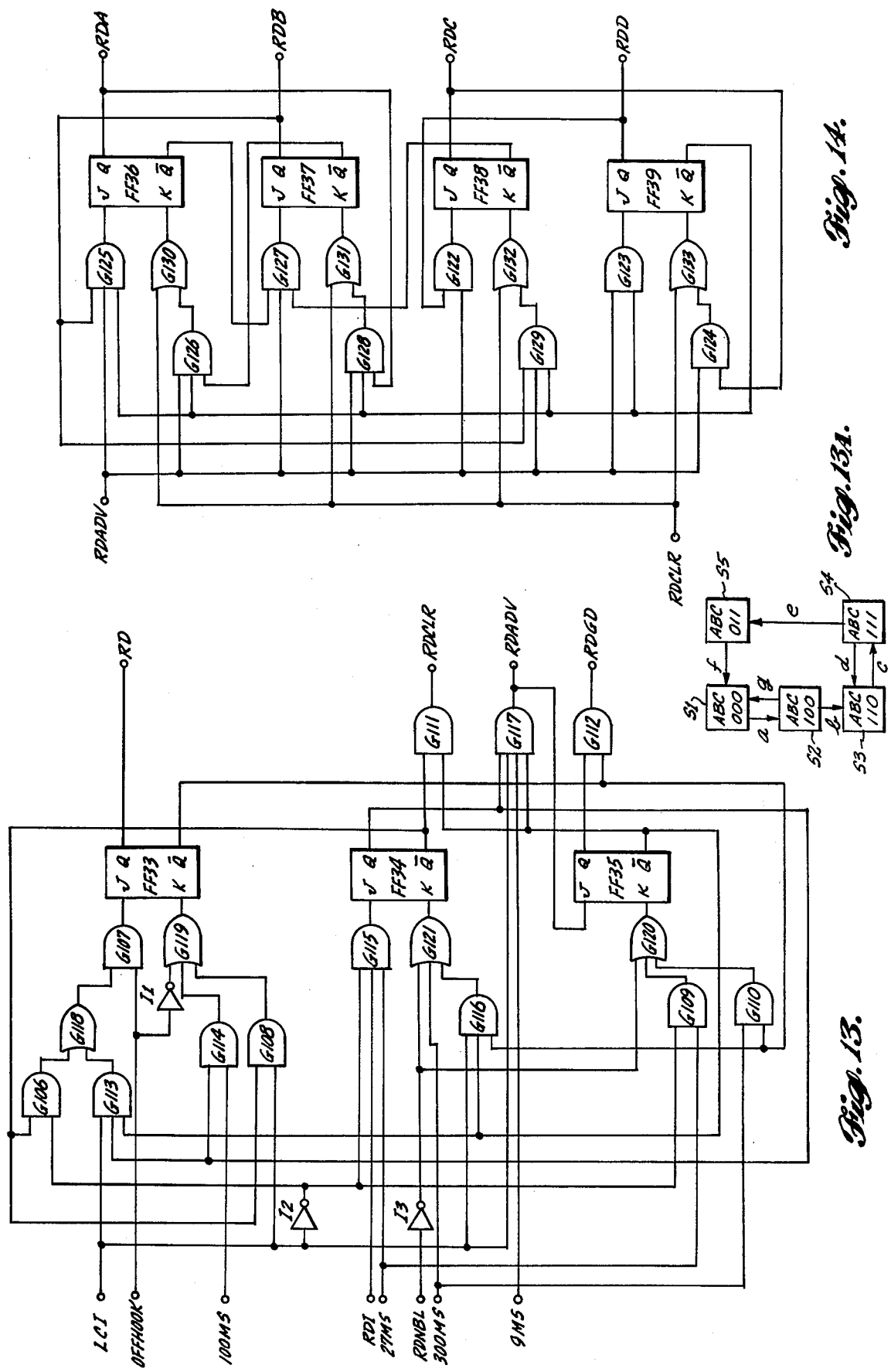

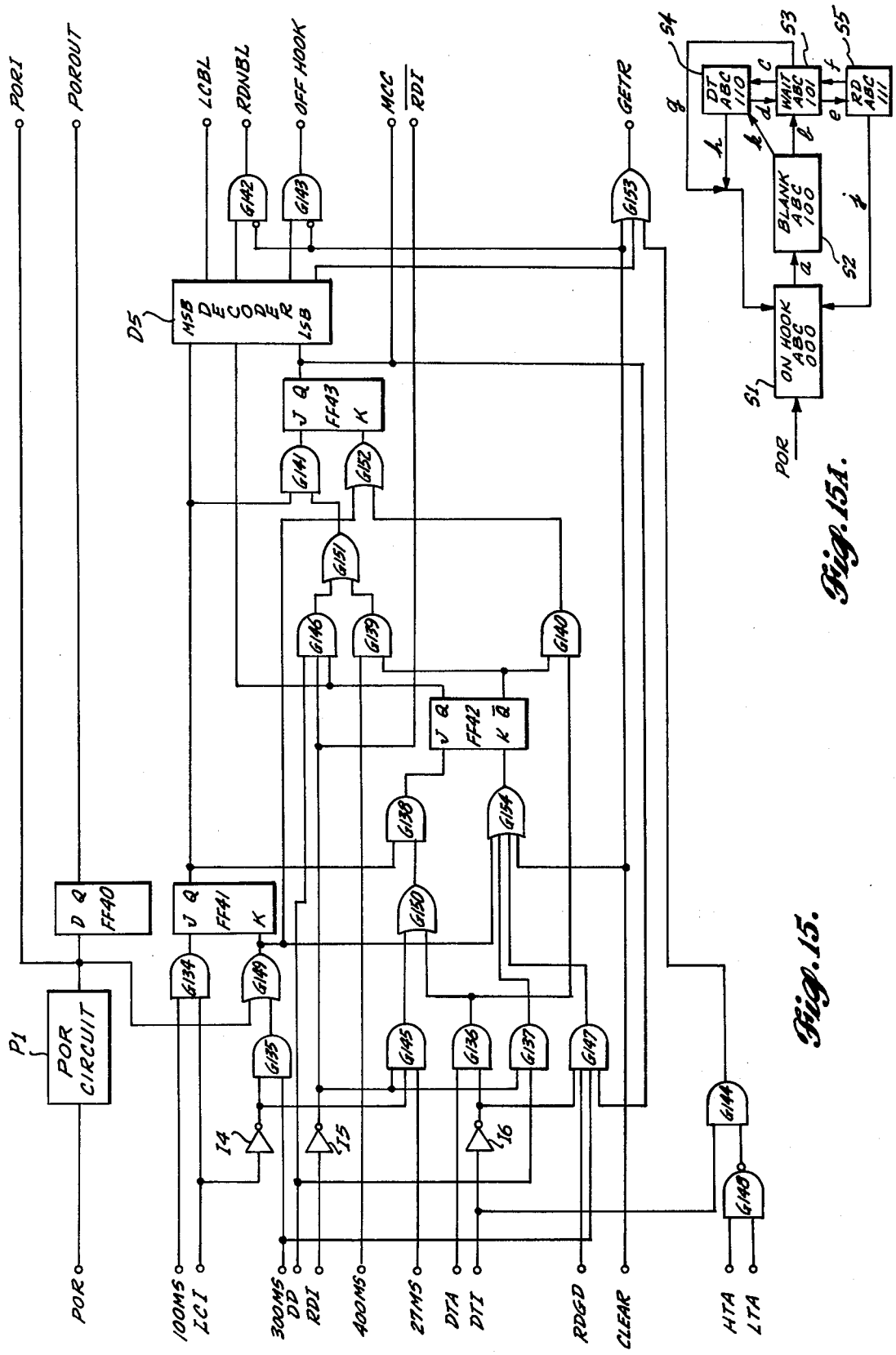

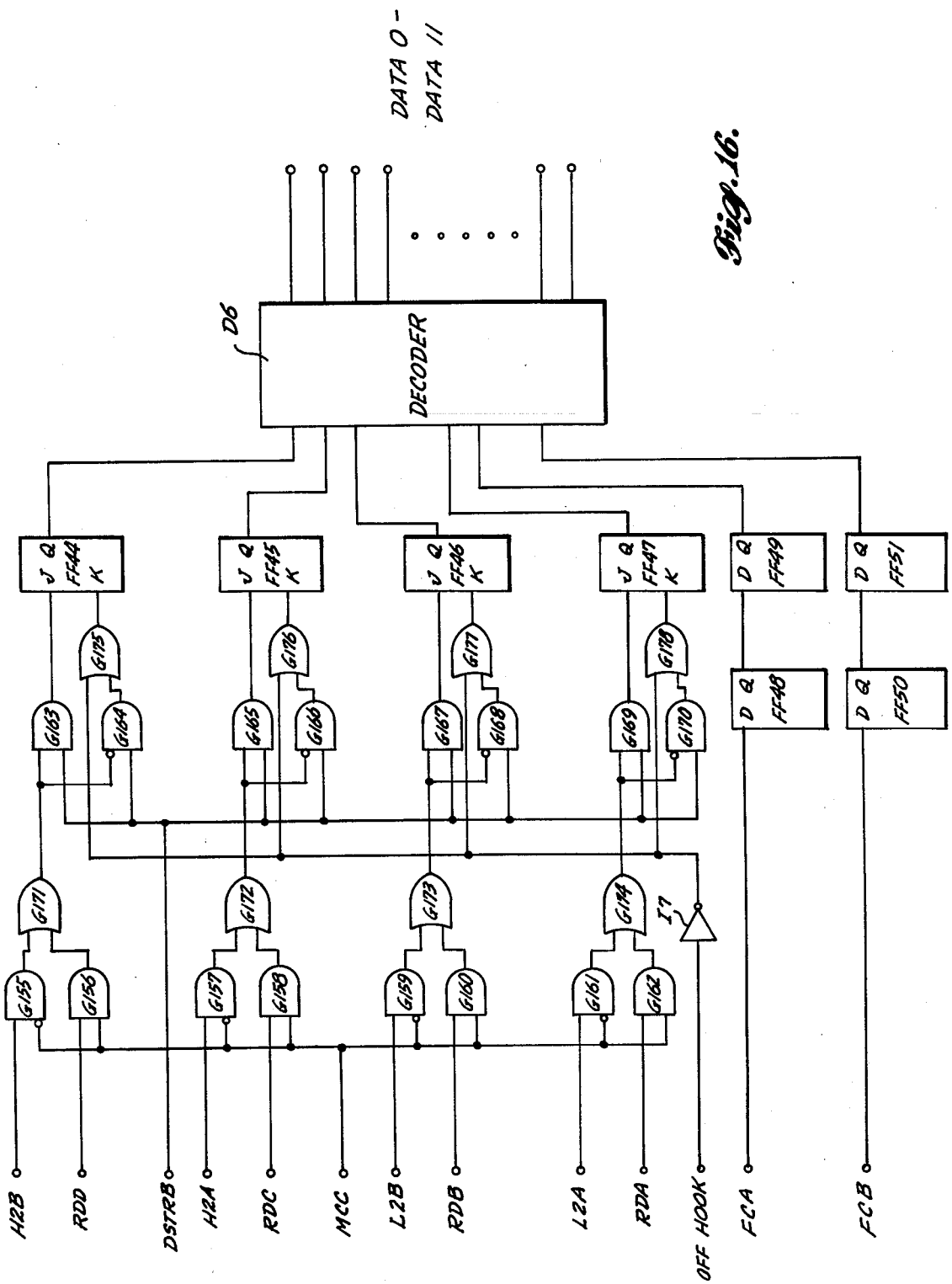

| | | | FF44 (Q) | 0 | 0 | 0 | 1 | 1 | 1 | 1 | 1 | 0 | 0 | 0 | 0 | 1 | 1 | 0 |
|---|---|---|---|---|---|---|---|---|---|---|---|---|---|---|---|---|---|---|
| | | | FF45 (Q) | 1 | 1 | 1 | 1 | 1 | 1 | 0 | 0 | 0 | 0 | 0 | 0 | 1 | 1 | 0 | 0 |
| | | | FF46 (Q) | 0 | 1 | 1 | 0 | 1 | 1 | 0 | 1 | 1 | 0 | 0 | 1 | 0 | 0 | 0 | 0 |
| | | | FF47 (Q) | 1 | 1 | 0 | 1 | 1 | 0 | 1 | 1 | 0 | 1 | 1 | 0 | 0 | 0 | 0 | 0 |
| | | | DIGIT | 1 | 2 | 3 | 4 | 5 | 6 | 7 | 8 | 9 | 0 | * | # | A | B | C | D |
| | | | FL | 697 | | | 770 | | | 852 | | | 941 | | | 697 | 770 | 852 | 941 |
| FCB | FCA | | FH | 1209 | 1336 | 1477 | 1209 | 1336 | 1477 | 1209 | 1336 | 1477 | 1209 | 1336 | 1477 | 1633 | | | |
| 0 | 0 | 1 OF 12 | DATA 0 | 0 | 1 | 1 | 1 | 1 | 1 | 1 | 1 | 1 | 1 | 1 | 1 | 1 | 1 | 1 | 1 |
| | | | 1 | 1 | 0 | 1 | 1 | 1 | 1 | 1 | 1 | 1 | 1 | 1 | 1 | 1 | 1 | 1 | 1 |
| | | | 2 | 1 | 1 | 0 | 1 | 1 | 1 | 1 | 1 | 1 | 1 | 1 | 1 | 1 | 1 | 1 | 1 |
| | | | 3 | 1 | 1 | 1 | 0 | 1 | 1 | 1 | 1 | 1 | 1 | 1 | 1 | 1 | 1 | 1 | 1 |
| | | | 4 | 1 | 1 | 1 | 1 | 0 | 1 | 1 | 1 | 1 | 1 | 1 | 1 | 1 | 1 | 1 | 1 |
| | | | 5 | 1 | 1 | 1 | 1 | 1 | 0 | 1 | 1 | 1 | 1 | 1 | 1 | 1 | 1 | 1 | 1 |
| | | | 6 | 1 | 1 | 1 | 1 | 1 | 1 | 0 | 1 | 1 | 1 | 1 | 1 | 1 | 1 | 1 | 1 |
| | | | 7 | 1 | 1 | 1 | 1 | 1 | 1 | 1 | 0 | 1 | 1 | 1 | 1 | 1 | 1 | 1 | 1 |
| | | | 8 | 1 | 1 | 1 | 1 | 1 | 1 | 1 | 1 | 0 | 1 | 1 | 1 | 1 | 1 | 1 | 1 |
| | | | 9 | 1 | 1 | 1 | 1 | 1 | 1 | 1 | 1 | 1 | 0 | 1 | 1 | 1 | 1 | 1 | 1 |
| | | | 10 | 1 | 1 | 1 | 1 | 1 | 1 | 1 | 1 | 1 | 1 | 0 | 1 | 1 | 1 | 1 | 1 |
| | | | 11 | 1 | 1 | 1 | 1 | 1 | 1 | 1 | 1 | 1 | 1 | 1 | 0 | 1 | 1 | 1 | 1 |
| 0 | 1 | 2 OF 8 PLUS BINARY | DATA 0 | 1 | 0 | 1 | 0 | 1 | 0 | 1 | 0 | 1 | 0 | 1 | 0 | 1 | 0 | 1 | 0 |
| | | | 1 | 0 | 1 | 1 | 0 | 0 | 1 | 1 | 0 | 0 | 1 | 1 | 0 | 0 | 1 | 1 | 0 |
| | | | 2 | 0 | 0 | 0 | 1 | 1 | 1 | 1 | 0 | 0 | 0 | 0 | 1 | 1 | 1 | 1 | 0 |
| | | | 3 | 0 | 0 | 0 | 0 | 0 | 0 | 0 | 1 | 1 | 1 | 1 | 1 | 1 | 1 | 1 | 0 |
| | | | 4 | 0 | 0 | 0 | 1 | 1 | 1 | 1 | 1 | 1 | 1 | 1 | 0 | 1 | 1 | 1 | 1 |
| | | | 5 | 1 | 1 | 1 | 0 | 0 | 0 | 1 | 1 | 1 | 1 | 1 | 1 | 0 | 1 | 1 | 1 |
| | | | 6 | 1 | 1 | 1 | 1 | 1 | 0 | 0 | 0 | 1 | 1 | 1 | 1 | 1 | 0 | 1 | 1 |
| | | | 7 | 1 | 1 | 1 | 1 | 1 | 1 | 1 | 0 | 0 | 0 | 1 | 1 | 1 | 1 | 0 | 1 |
| | | | 8 | 0 | 1 | 1 | 0 | 1 | 1 | 0 | 1 | 1 | 0 | 1 | 1 | 1 | 1 | 1 | 1 |
| | | | 9 | 1 | 0 | 1 | 1 | 0 | 1 | 1 | 0 | 1 | 1 | 0 | 1 | 1 | 1 | 1 | 1 |
| | | | 10 | 1 | 1 | 0 | 1 | 1 | 0 | 1 | 1 | 0 | 1 | 1 | 0 | 1 | 1 | 1 | 1 |
| | | | 11 | 1 | 1 | 1 | 1 | 1 | 1 | 1 | 1 | 1 | 1 | 0 | 0 | 0 | 0 | 0 | 0 |
| 1 | 0 | BINARY ONLY | DATA 0-3 | SAME AS ABOVE | | | | | | | | | | | | | | | |
| | | | 4-11 | 1 | 1 | 1 | 1 | 1 | 1 | 1 | 1 | 1 | 1 | 1 | 1 | 1 | 1 | 1 | 1 |
| 1 | 1 | BLANK | DATA 0-11 | 1 | 1 | 1 | 1 | 1 | 1 | 1 | 1 | 1 | 1 | 1 | 1 | 1 | 1 | 1 | 1 |

Fig. 17.

DTMF AND ROTARY DIAL SIGNAL RECEIVER

BACKGROUND OF THE INVENTION

This invention is directed to receivers and, more particularly, to receivers suitable to receiving digit information in either DTMF or rotary dial pulse form and, in accordance therewith, producing related binary data.

In the past, a wide variety of devices for receiving telephone-produced digit signals determining the accuracy of such signals and, if accurate, producing related data, have been proposed. As will be readily recognized by those skilled in the telephone art, telephone-produced digit signals may take one of two forms. They may take the form of dual-tone multifrequency (DTMF) signals or the form of rotary dial pulses.

Regardless of the nature of the telephone-produced digit signals, it is often necessary to convert such signals into some other data form useful by other (downstream) circuitry. Such data form may be binary, either serial or parallel. For example, it is often necessary to convert DTMF signals into a form suitable for use by downstream circuitry to create a series of pulses similar to those produced by a rotary dial pulse telephone for a particular digit. Devices for producing or converting DTMF signals into rotary dial-type pulses are often referred to as tone-to-pulse converters. Such converters first determine if the input signal is valid. If valid, they produce digital data, usually in parallel binary form. The digital data causes downstream circuits to outpulse a series of pulses similar to those produced by a rotary dial-type telephone. One patent directed to such an arrangement, assigned to the assignee of the present application, is U.S. Pat. No. 3,912,869 entitled "Multi-Frequency-to-Digital Converter" by Richard J. Ullakko.

In the case of rotary dial produced digits, it often necessary to receive the digit related pulses, determine their validity and cause a similar set of rotary dial-type pulses to be outpulsed. This procedure is normally used in long-line telephone systems in order to enhance the rotary dial pulses so that they are not misinterpreted when received by a central office or other circuitry. Again, usually, after pulse validity is determined, related digital data is produced. The digital data causes downstream outpulsing circuitry to produce the similar set of pulses.

In either case, of course, the DTMF or dial pulse digital data may be used for other purposes, i.e., purposes other than creating a series of related or similar dial-type pulses.

In any event, as will be readily appreciated by those skilled in the art (and those not so skilled from the foregoing description), it is frequently necessary to decode, receive, and convert DTMF and rotary dial pulse digit information into some other data form. In many cases it is necessary to handle both types of signals, as a result of both DTMF and rotary dial telephones being connected to the same line. In the past, when such a requirement existed, usually separate circuits were provided, one dedicated to each type of signal. As a result, unduly complex and, therefore, expensive overall systems resulted. In addition to the disadvantage of requiring two separate and distinct subsystems, in many cases the subsystems themselves were more complicated and expensive than desirable. In general, because of their separate and distinct nature, such subsystems were not ideally suited for implementation in large-scale integrated (LSI) circuit form. Another reason many such circuits are not suited for implementation in LSI form is a direct result of their analog nature. That is, analog systems are generally not suitable for implementation in LSI form, whereas digital circuits generally are suitable for implementation in LSI form. As will be readily appreciated by those skilled in the electronics art, circuits suitable for implementation in LSI form are generally substantially cheaper to produce in mass than are circuits formed of either discrete components or discrete subsystems, e.g., counters, decoders etc.

Therefore it is an object of this invention to provide a new and improved dial signal receiver.

It is also an object of this invention to provide a receiver suitable for receiving and decoding telephone digit signals in either tone or pulse form.

It is a further object of this invention to provide a receiver suitable for receiving and decoding telephone digit signals in either DTMF or rotary dial pulse form.

It is another object of this invention to provide a new and improved receiver for receiving and decoding telephone digit signals in either DTMF or rotary dial pulse form that is suitable for implementation in large-scale integrated circuit form.

As will be readily appreciated by those familiar with telecommunications systems, in order to be truly universal, a dial signal receiver must be compatible with a variety of different types of telephone systems. For example, it is necessary to prevent a dial signal receiver from reacting to telephone-switching-system interruptions that simulate dial pulses. Further, it is necessary to prevent dial signal receivers from responding to very low level signals, as might be caused by cross talk. Also, it is necessary to minimize the possibility that a receiver adapted to receive DTMF digits will respond to false signals, e.g., voice, music or other signals normally carried by a telephone line. Moreover, in a truly versatile dial signal receiver it is necessary to be able to selectively inhibit either the dual-tone multifrequency conversion aspect or the rotary dial pulse enhancement aspect, as dictated by particular system requirements. Finally, in some telephone systems it is necessary to split a telephone line early in a tone-to-pulse conversion sequence in order to prevent downstream circuitry, which may also be adapted to convert DTMF tones into rotary dial-type pulses, from being activated. In such environments, it is necessary to recognize at an early point in the conversion cycle that a valid DTMF digit is likely to be present and, based on this initial information, split the line. If the initial check proves to be false, the line is simply restored. A similar requirement may be present in rotary dial pulse enhancement systems, i.e., those adapted to receive rotary dial pulses, determine the validity of those pulses and create related digital data signals suitable for creating rotary dial-type pulses for transmission. A similar requirement is present in such systems if it is necessary to split the line early in order to prevent downstream circuits from receiving both the original pulses and the "enhanced" pulses. Of course, in some instances, the line may be continuously split or split as a result of the actions of other circuits. In such instances an early split is unnecessary.

Therefore, it is a further object of this invention to provide a dial signal receiver that is suitable for widespread use in a variety of telephone communication systems.

It is another object of this invention to provide a dial signal receiver that is insensitive to extraneous signals on a telephone line to which it is connected.

It is another object of this invention to provide a dial signal receiver for receiving and decoding telephone signals of various types that has the ability to recognize early the presence of potentially valid signals and, in accordance therewith, produce a signal suitable for creating line splitting prior to making a final determination of the validity of the received signal.

SUMMARY OF THE INVENTION

In accordance with this invention, a receiver for receiving and decoding telephone produced digit signals is provided. The digit signals may either take the form of dual-tone, multifrequency (DTMF) signals or rotary dial pulses. In its preferred form, the invention includes a DTMF subsystem; a rotary dial subsystem; a main controller; and, an output register and decoder. The DTMF subsystem determines the validity of DTMF signals and is based on a time domain filtering technique. DTMF signals are determined to be valid, and accepted if, simultaneously, both the high and low frequency components of such signals, derived from a band-split filter, repetitively pass a short term check; and, each component passes a long term check once. The short term checks comprise repetitively measuring the period of two consecutive cycles of each component of the input signal. The long term checks comprise measuring the period of a number of cycles of each component of the input signal. The number of cycles is dependent on the nominal frequency of the related component, as determined by the short term checks. The rotary dial subsystem determines the validity of rotary dial pulses. Rotary dial pulse digits are accepted if they establish a break in loop current lasting at least a predetermined time period, followed by a restoration of loop current for a predetermined time period. The main controller controls whether or not the DTMF or rotary dial subsystems, or both, are enabled to receive and determine the validity of their related signals. When either the DTMF or rotary dial subsystem determines that a received signal is valid, that subsystem produces data bits related to the digit value of the received signal. The output register and decoder receives the data bits produced by the DTMF and rotary dial subsystems and, in accordance with a format code, creates related digital data.

Preferably the DTMF subsystem includes two separate and distinct channel circuits, one for testing the high frequency components and the other for testing the low frequency components of a received DTMF signal. The channel circuits are cross-coupled such that, if one or the other of the components fails either its short term check or its long term check, the channel circuits are reset; and, a valid DTMF signal is not recognized and decoded.

In accordance with further aspects of this invention, a preferred form of the invention is formed such that either the DTMF subsystem or the rotary dial subsystem can be disabled, as desired. Preferably, normally, the DTMF subsystem is enabled and the rotary dial subsystem is disabled. However, this arrangement can be reversed; or both the DTMF subsystem and the rotary dial subsystem can be enabled. Moreover, in its preferred form, the dial signal receiver of the inventon can be wired such that the recognition of either a DTMF signal or a rotary dial signal enables the related subsystem and disables the other subsystem. Obviously, some of these ancillary features can be deleted, if desired.

In addition to the principal aspects of the invention set forth above, in its preferred form, the DTMF subsystem recognizes early the likelihood that a particular signal is probably a valid DTMF signal. In accordance with such early recognition, an early line split control signal is produced. The rotary dial subsystem produces a signal that can be used in a similar manner, i.e., to control early line splitting.

Preferably the invention is implemented in large scale integrated (LSI) circuit form and, in addition to the foregoing features, includes subcircuits for preventing extraneous signals, such as spurious DTMF signals caused by music, voice or cross-talk, or loop current interruptions that stimulate dial pulses etc., from being recognized and creating an erroneous output. Additionally, preferably, the invention is formed such that it has the ability to hold a digital data code upon the receipt of a suitable HOLD signal. Also, preferably, output signals denoting the receipt of good data (either DTMF or rotary dial), application of power to the receiver, OFF-HOOK states of a related telephone and the like are produced.

It will be appreciated from the foregoing description that the invention provides a new and improved dial signal receiver. The receiver of the invention accommodates both DTMF and rotary dial digit signals. Since the invention is suitable for implementation in large-scale integrated circuit form, it is both inexpensive to produce and suitable for use in a wide variety of systems including combined systems, i.e., systems including both DTMF and rotary dial-type telephones, or systems including only one type of telephone. In the latter case, of course, the subsystem related to the "other" type of telephone simply isn't used. Moreover, the invention is versatile. For example, because the invention has the ability to produce output information in different formats, it is compatible with a wide variety of telephone communications systems. Moreover, it is admirably suited to function at points in telephone systems requiring early splitting in order to prevent the erroneous activation of downstream circuits.

BRIEF DESCRIPTION OF THE DRAWINGS

The foregoing objects and many of the attendant advantages of this invention will become more readily appreciated as the same becomes better understood by reference to the following detailed description, when taken in conjunction with the accompanying drawings, wherein:

FIG. 4 is a block diagram of a rotary dial subsystem, suitable for use in the embodiment of the invention illustrated in FIG. 1, in combination with a main controller and an output register and decoder;

FIG. 9 is a logic diagram of a low frequency, long term counter, suitable for use in the DTMF subsystem illustrated in FIG. 3;

FIG. 10 is a logic diagram of a low frequency, long term test circuit, suitable for use in the DTMF subsystem illustrated in FIG. 3;

FIG. 13 is logic diagram of a rotary dial controller, suitable for use in the rotary dial subsystem illustrated in FIG. 4;

FIG. 13A is a state diagram illustrating the operation of the rotary dial controller illustrated in FIG. 13;

FIG. 14 is a logic diagram of a dial pulse counter, suitable for use in the rotary dial subsystem illustrated in FIG. 4;

FIG. 15 is a logic diagram of a main controller, suitable for use in the embodiment of the invention illustrated in FIG. 1;

FIG. 15A is a state diagram illustrating the operation of the main controller illustrated in FIG. 15;

FIG. 16 is a logic diagram of a output register and decoder, suitable for use in the embodiment of the invention illustrated in FIG. 1; and, FIG. 17 is a table illustrating three suitable data formats and a blank format usable by the output register and decoder illustrated in FIG. 16.

DESCRIPTION OF THE PREFERRED EMBODIMENT

Figure 1:
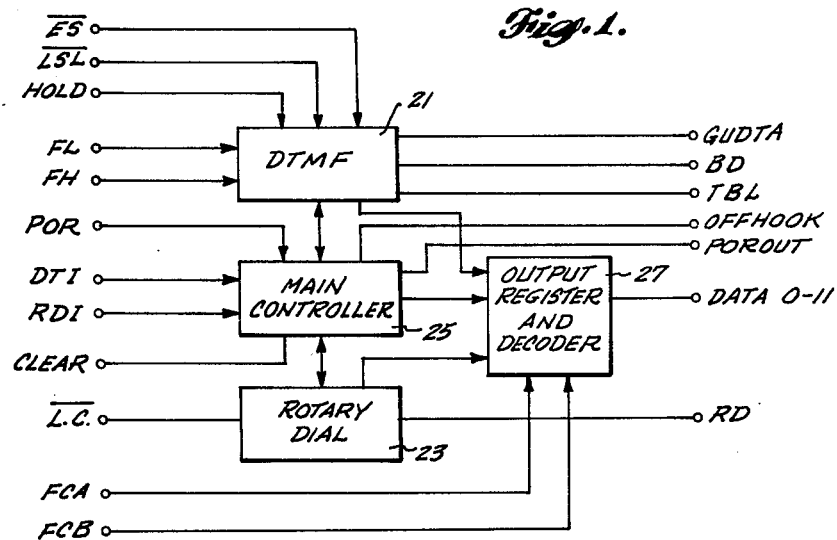
FIG. 1 is a block diagram of a preferred embodiment of a dial signal receiver formed in accordance with the invention.

FIG. 1 is a block system diagram of a preferred embodiment of a dial signal receiver formed in accordance with the invention. As will be better understood from the following description, a dial signal receiver formed in accordance with the invention is suitable for implementation as a large-scale integrated circuit. The embodiment illustrated in FIG. 1 is simplified to the extent that it does not illustrate the timing subsystem necessary to form an operating dial signal receiver. That is, FIG. 1 does not illustrate a master clock subsystem adapted to count an externally produced clock signal in order to develop master timing signals suitable for use by various subsystems to operate flip-flops, subsystem counters etc., since suitable master clock subsystems are well known. In a similar manner, flip-flops, subsystem counters and other circuits requiring clock inputs illustrated in the hereinafter described logic diagrams do not include clock inputs. However, all such items (unless some other frequency is shown) are operated at a common, predetermined frequency, such as 223.7 kHz. Similarly, except for illustrating a general sensing power input (POR) and a power denoting output (POR-OUT), power connections are not illustrated in the hereinafter described logic circuits. Again, this deletion is made for purposes of each of understanding of the invention, even though it will be readily recognized by those skilled in the art that power must be applied to the illustrated circuits.

System Description

The embodiment of the invention illustrated in FIG. 1 comprises: a DTMF subsystem 21: a rotary dial subsystem 23; a main controller 25; and, an output register and decoder 27.

Figure 2:
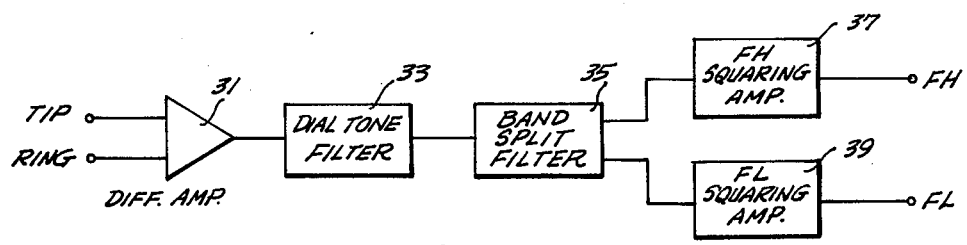
FIG. 2 is a block diagram of an input circuit suitable for use in conjunction with the receiver illustrated in FIG. 1 to split DTMF signals into high and low frequency components.

The DTMF subsystem 21 receives high and low frequency components (FH and FL) produced by a suitable circuit splitting a received DTMF signal into its high and low frequency components. A general form of such a circuit is illustrated in FIG. 2 and comprises: a differential amplifier 31; a dial tone filter 33; a band split filter 35; a high frequency (FH) squaring amplifier 37; and, a low frequency (FL) squaring amplifier 39. The tip and ring lines of a telephone cable are each connected to one input of the differential amplifier 31. The output of the differential amplifier is connected through the dial tone filter 33 to the input of the band-split filter 35. The band-split filter 35 splits the received DTMF signal into its high and low frequency components. The high frequency component is applied to and squared by the high frequency squaring amplifier 37. The output of the high frequency squaring amplifier is the high frequency component designated FH. The low frequency component is applied to and squared by the low frequency squaring amplifier 39. The output of the low frequency squaring amplifier is the low frequency component designated FL.

As will be understood by those skilled in DTMF telephone systems, when a button of a DTMF telephone is depressed, a tone consisting of one high frequency component and one low frequency component is produced. The tone components are chosen from groups comprising four low frequency and four high frequency components. The low frequency components have the nominal frequencies of: 697, 770, 852, and 941 Hz. The high frequency components have the nominal frequencies of 1209, 1336, 1477 and 1633 Hz. While sixteen possible combinations are possible, only twelve are normally used, since a DTMF telephone only has twelve buttons.

Returning to FIG. 1, in addition to receiving squared FH and FL DTMF components, the DTMF subsystem 21 also receives externally produced control signals designated HOLD, $\overline{\text{LSL}}$, and $\overline{\text{ES}}$. HOLD is a control signal adapted to prevent the transfer of DTMF data from the DTMF subsystem to the output register and decoder 27. This inhibiting action occurs when HOLD is high. If a transfer would have taken place but for HOLD being high, the transfer will take place when HOLD goes low. $\overline{\text{ES}}$ is a control signal that controls whether or not the dial signal receiver is to include an early split mode of operation. When $\overline{\text{ES}}$ is held low an early split mode of operation is implemented. When $\overline{\text{ES}}$ is held high the early split mode of operation is inhibited. $\overline{\text{LSL}}$ denotes the line split status of the line. Normally, this is that state of a downstream line split latch. (As will be recognized by those skilled in the telephone arts, a line split latch is utilized to latch a line in a split mode of operation is systems where it is necessary to split the tip and ring lines during the operation of certain circuitry, such as the dial signal receiver of the invention.)

In addition to producing internal signals that are applied to the main controller 25 and the output register and decoder 27, the DTMF subsystem 21 also produces three signals useful by other circuits. These signals are denoted BD, GUDTA and TBL. BD stands for buttons down and goes high either when a high or low frequency component is found acceptable as a result of passing its short term check; or when the rotary dial subsystem detects a valid digit, if $\overline{ES}$ is low. BD is useful to control the line split relay. TBL stands for blanking time. TBL goes high when the line is split and is useful to control other circuits to null out the large transients which would otherwise be seen by the band-split filter (FIG. 2) during line splitting. GUDTA is an output strobing signal. That is, when either the DTMF subsystem determines that a valid DTMF signal has been detected, or the rotary dial subsystem determines that a valid rotary dial digit has been detected, GUDTA shifts from a normal low state to a high state. This shift is used to advise downstream circuits that data is stored in the output register and decoder and, available to be read out. Or, GUDTA can be connected to the DTI and RDI inputs of the main controller, as discussed below.

The rotary dial subsystem 23 receives an input signal denoted $\overline{LC}$ produced by a loop current detection circuit (not shown). The state of this signal denotes the presence or absence of loop current. More specifically, when the loop current detection circuit detects the presence of loop current, $\overline{LC}$ goes low. When a break in loop current occurs, $\overline{LC}$ goes high. Since rotary dial pulses are, in effect, interruptions in loop current, an $\overline{LC}$ shift from a low state to a high state and then back to a low state occurs for each dial pulse. In addition to producing internal signals applied to the main controller 25 and the output register and decoder 27, the rotary dial subsystem 23 produces one externally useful output signal denoted RD. RD goes high when rotary dial pulses are detected and stays low when they are not detected.

The main controller 25 has four external control inputs designated POR, DTI, RDI, and CLEAR. POR goes high when power is applied to the dial signal receiver of the invention causing the main controller and the DTMF and rotary dial subsystems to be reset. In addition, the initial shift of POR high causes the output register of the output register and decoder 27 to be cleared; and, forces an output of the main controller, designated OFF-HOOK, low. For a short period of time, during which power rises from zero to its steady state level, in sync with a clock pulse, the main controller causes an output designated POROUT to shift high. POROUT may be used to initialize (reset) other (downstream) circuits.

The CLEAR input to the main controller is an external reset input that functions somewhat similar to POR. Specifically, when CLEAR goes high the DTMF and rotary dial subsystems 21 and 23 are reset and the output register and decoder 27 is cleared. In addition, OFF-HOOK is forced low. Further, if the main controller is in either its DTMF or rotary dial modes of operation, hereinafter described, it is temporarily shifted to a wait (blank) mode of operation.

The high/low state of the DTI (dual-tone inhibit) and RDI (rotary dial inhibit) inputs to the main controller control the inhibiting or enabling of the DTMF and the rotary dial subsystems, respectively. When both inputs are low both subsystems are enabled. When DTI is low and RDI is high only the DTMF subsystem is enabled, the rotary dial system being inhibited. When RDI is low and DTI is high the reverse is true. In this regard, if the GUDTA output of the DTMF subsystem is applied to the DTI and RDI inputs of the main controller, when one of the DTMF or rotary dial subsystems becomes operative, the other will automatically be inhibited as soon as the first digit is received. In other words the GUDTA output can be used to fix the mode of operation. Thereafter a sequence of the same type of signals can be received; but a mixture of signals (DTMF and pulse) will not be recognized.

The output register and decoder 27, in addition to receiving signals from the DTMF subsystem 21, the rotary dial subsystem 23 and the main controller 25, also receives a pair of external control signals, designated FCA and FCB, which denote format control signals A and B. The high/low state of these signals controls the format of the data produced by the output register and decoder 27 on its twelve parallel output lines, designated DATA 0-11. That is, the output register and decoder 27 decodes the data output of either the DTMF subsystem or the rotary dial subsystem in accordance with the high/low states of FCA and FCB; and, the decoded output is available on data lines DATA 0-11.

It will be appreciated from the foregoing functional, summary description that the preferred embodiment of the invention is directed to a receiver suitable for receiving and decoding either DTMF or rotary dial types of telephone digit signals. The invention is versatile in that it is useful in systems where the tip and ring lines are normally split or in systems where it is necessary to split the tip and ring lines at an early point in a decoding sequence. The invention is also versatile in the sense that it can be used to selectively decode only DTMF signals, only rotary dial signals, or both as desired. In addition, the invention has the ability to provide different types of output codes as determined by format control inputs. The following description discusses in more detail the preferred embodiment of the invention illustrated in FIG. 1.

DTMF Subsystem

Figure 3:
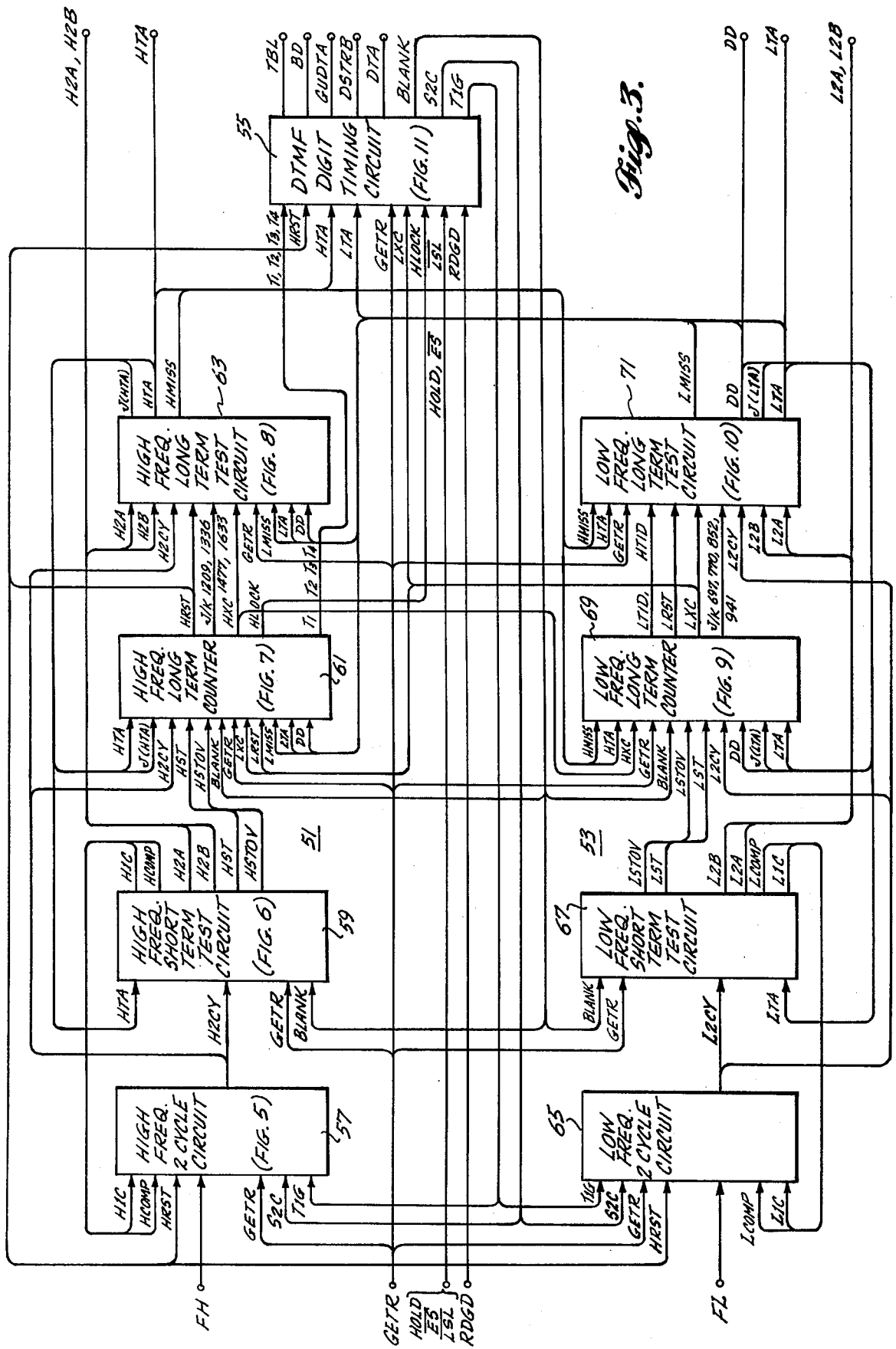
FIG. 3 is a block diagram of a preferred embodiment of a DTMF subsystem suitable for use in the embodiment of the invention illustrated in FIG. 1.

FIG. 3 is a block diagram of a DTMF subsystem, formed in accordance with the invention and suitable for use in the dial signal receiver illustrated in FIG. 1. Logic circuits suitable for carrying out the functions of the various blocks illustrated in FIG. 3 are illustrated in FIGS. 5-11, and are also hereinafter described.

The DTMF subsystem illustrated in FIG. 3 generally comprises: a high frequency channel circuit 51; a low frequency channel circuit 53; and a DTMF digit-timing circuit 55. The high frequency channel circuit includes: a high frequency, 2-cycle circuit 57; a high frequency short term test circuit 59; a high frequency long term counter 61; and, a high frequency long term test circuit 63. Similarly, the low frequency channel circuit 53 includes a low frequency 2-cycle circuit 65; a low frequency short term test circuit 67; a low frequency long term counter 69; and, a low frequency long term test circuit 71.

Each of the high and low frequency channel circuits 51 and 53 functions in a generally identical manner. More specifically, the high and low frequency 2-cycle circuits 57 and 65 receive the FH and FL signals, respectively. Assuming no external complications are present (such as internal or external reset signals being applied to any of the various logic circuits) each 2-cycle circuit produces a pulse train at a frequency equal to one-half their related input frequency. Thus, the high frequency 2-cycle circuit produces a pulse train, H2CY, having a frequency equal to one-half (½) FH and the low frequency 2-cycle circuit produces a pulse train, L2CY, having a frequency equal to one-half (½) FL.

H2CY and L2CY are continuously short term checked or tested by the related high or low frequency short term test circuit 59 or 67 to determine if the FH and FL frequencies that they represent are valid high and low frequency components. Assuming that they are valid, they control the state of two-bit high and low frequency codes, H2A, H2B and L2A, L2B, respectively. Thus, the binary or high/low states of H2A, H2B and L2A, L2B are related to the frequency of FH and FL, respectively, H2A, H2B and L2A, L2B are applied to the high and low frequency long term test circuits 63 and 71, respectively, as well as to the output register and decoder 31, as illustrated in FIGS. 4 and 16, hereinafter described.

H2CY and L2CY are applied to the high and low frequency long term counters 61 and 69; and to the high and low frequency long term test circuits 63 and 71, respectively. The high and low frequency long term counters, as will be better understood from the following description of the logic illustrated in FIG. 7, include counters that produce a series of time related output signals that are utilized by the high and low frequency long term test circuits to create "windows". In order for a long term check or test to be passed, an H2CY or L2CY pulse must occur during an open window period. When both short and long term tests are passed related high and low frequency acceptance signals (HTA and LTA) go high. In this regard, and as will be better understood from the following discussion of the logic circuits illustrated in FIGS. 5-10, the high and low frequency channel circuits are cross-coupled in a manner that causes both channel circuits to be reset if any of the tests is failed, promptly after such failure.

In addition to the foregoing general functions, when the dial signal receiver is conditioned for an early split mode of operation (e.g., $\overline{ES}$ is low), the high and low frequency 2-cycle circuits are conditioned to simulate H2CY and L2CY pulse trains, whereby the remaining circuits in the high and low frequency channel circuits 51 and 53 remain operative. In the absence of such simulation erroneous H2CY and L2CY pulse trains could be formed whereby the cross-coupled high and low frequency channel circuits would be reset.

The DTMF digit timing circuit controls the operation of the high and low frequency 2-cycle counters during early split. In addition, the DTMF digit timing circuit produces several information signals, including the BD, GUDTA and TBL signals discussed above with respect to FIG. 1. In addition to these externally used signals, some of which are also internally used, the DTMF digit timing circuit produces two signals denoted DTA and DSTRB. DTA goes high when both the high and low frequency components have been found to be acceptable, or when digit related rotary dial pulses have been found to be acceptable. (The state of the RDGD signal produced by the rotary dial subsystem in the manner hereinafter described denotes the receipt of acceptable rotary dial pulses). Shortly thereafter, DSTRB goes high to strobe related data into the output register and decoder 31.

High and Low Frequency 2-Cycle Circuits

Figure 5:
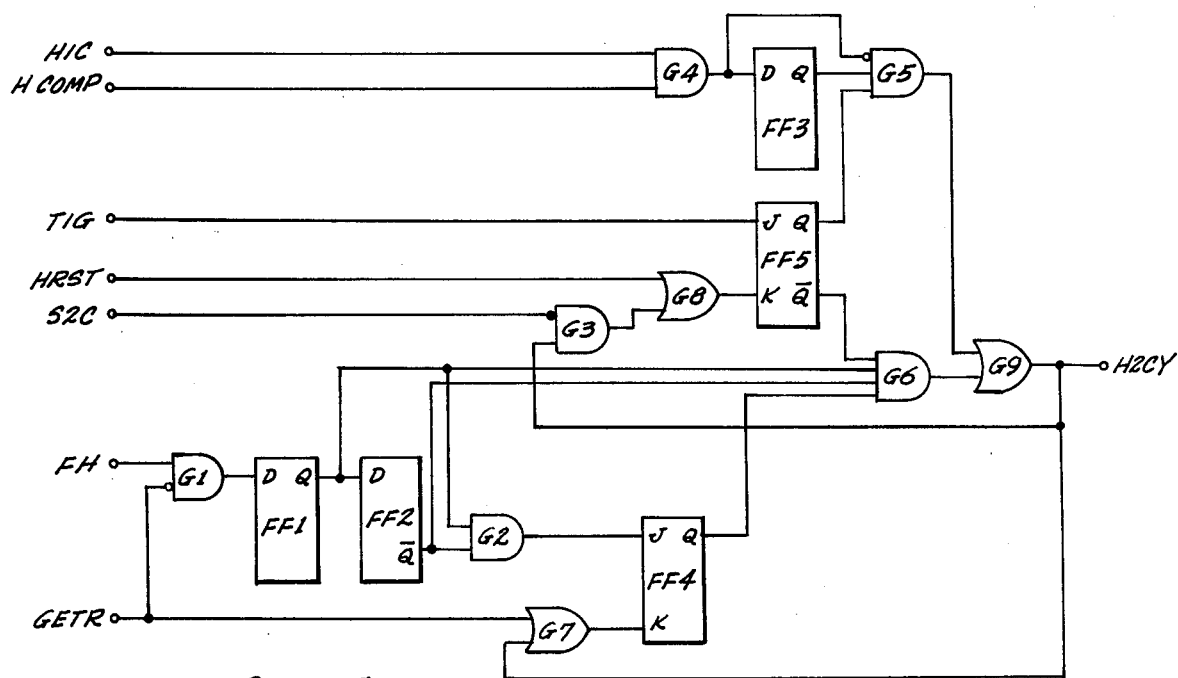
FIG. 5 is logic diagram of a high frequency, two-cycle circuit, suitable for use in the DTMF subsystem illustrated in FIG. 3.

FIG. 5 is a logic circuit of a high frequency 2-cycle circuit 57 suitable for use in the DTMF subsystem illustrated in FIG. 3. The high frequency 2-cycle logic circuit illustrated in FIG. 5 comprises: three delay (D) flip-flops designated FF1, FF2, and FF3; two JK flip-flops designated FF4 and FF5; four two-input AND gates designated G1, G2, G3 and G4; one three-input AND gate designated G5; one four-input AND gate designated G6; and three two-input OR gates designated G7, G8 and G9. As illustrated in FIG. 5 and in many of the other logic circuits hereinafter described certain inputs of certain gates are depicted by a small circle. As is standard in logic illustration this is done to eliminate the need to show (and thus describe) inverters. As will be readily understood these inverted (I) inputs mean that the related gate input controls or contributes to the functional operation of the gate when it is low rather than high. For purposes of dicussion these inputs are hereinafter referred to as I-inputs. In FIG. 5, G1, G3 and G5 each have one I-input.

FH is applied to one input of G1. A general tone reset signal designated GETR and produced by the main controller illustrated in FIG. 15 and hereinafter described, is applied to the I-input of G1. GETR is also applied to one input of G7. Normally GETR is low. When the main controller commands that the overall system be reset GETR goes high.

The output of G1 is connected to the D input of FF1 and the Q output of FF1 is connected to the D input of FF2. The Q output of FF1 is also connected to one input of G6 and to one input G2. The $\overline{Q}$ output of FF2 is connected to the second input of G2. The $\overline{Q}$ output of FF2 is further connected to a second input of G6. The output of G2 is connected to the J input of FF4. The Q output of FF4 is connected to the third input of G6. The output of G6 is connected to one input of G9. The output of G9 is connected to the second input of G7 and to an input of G3. The output of G7 is connected to the K input of FF4.

A simulate 2-cycle signal designated S2C, and produced by the DTMF digit-timing circuit 55, is applied to the I-input of G3. The output of G3 is connected to one input of G8. A high channel circuit reset signal designated HRST, and produced by the high frequency long term counter 61, is applied to the second input of G8. The output of G8 is connected to the K input of FF5. A gate signal designated TIG and produced by the DTMF digit timing circuit is applied to the J input of FF5. The Q output of FF5 is connected to the fourth input of G6. The Q output of FF5 is connected to one input of G5. A high channel circuit compare signal designated HCOMP and produced by the high frequency short term test circuit 59 is applied to one input of G4; and, a high channel circuit first-stage C flip-flop signal designated H1C and also produced by the high frequency short term test circuit 59 is applied to the second input of G4. The output of G4 is connected to the D input of FF3 and to the I-input of G5. The Q output of FF3 is connected to the remaining input of G5. The output of G5 is connected to the second input of G9.

Turning first to a description of the normal operation of the high frequency, 2-cycle circuit illustrated in FIG. 5 when a DTMF (or other) signal is received. In normal operation, FF5 is reset and the only signals of concern are FH and GETR. Assuming that the main controller is not commanding a general reset, GETR is low. As a result the output of G1 shifts back and forth between high and low states, at a rate related to the frequency of FH. These pulses are clocked into FF1 and cause the output of FF1 to swing back and forth between high and low states.

FF2 in conjunction with FF4, G2 and G6 form a divide-by-two circuit that produces a pulse train at a rate equal to one-half of the frequency of FH. This result occurs because the Q outputs of FF1 and FF4 and the $\overline{Q}$ output of FF2 are only coincidentally high once every other cycle of FH. The pulses occur on the leading edge of every other FH wave. As soon as the pulse is formed it terminates because the resulting H2CY high resets FF4 via G2. As a result, H2CY is a pulse train having a frequency equal to one-half the frequency of FH with the pulses occurring on the leading edge of every other FH wave. When GETR goes high, of course, FF1, FF2 and FF4 are reset to initial or quiescent states.

The foregoing discussion describes the "normal" operation of the high frequency 2-cycle circuit illustrated in FIG. 5. This operation is bypassed when the invention is conditioned to create an early line split; and, the line is not split when tones are first detected. Such operation is necessary because during the initial period of time when a telephone line is being split, transients are likely to occur. Such transients can distort FH to the degree that H2CY will either be lost entirely or the pulses making up the H2CY signal will occur at an erroneous frequency rate. In either case, the DTMF circuit is likely to reject the H2CY signal as invalid. In order to alleviate this problem, the normal operation of the high frequency 2-cycle circuit is interrupted or bypassed during line-splitting, for a period of time adequate to allow transients to settle out. During this period of time, the H2CY signal is simulated such that a pulse train, at the previous frequency rate, continues to occur.

In order to understand the simulate 2-cycle mode of operation of the high frequency 2-cycle circuit 57, the nature of HIC and HCOMP must first be understood. HIC is an overflow signal produced by the high frequency short term test circuit 59. As hereinafter described, HIC is high as long as the number of clock pulses counted by the counter forming part of the high frequency short term test circuit, between H2CY pulses, remains below the same predetermined level. If the clock pulses count surpasses this level, it means that FH is below a minimum level (e.g., FH is below 1209 Hz by some factor such as 10 Hz). When this overflow occurs H1C goes low. HCOMP is a compare pulse produced by the high frequency short term test circuit 59. A HCOMP pulse occurs each time the time between the latest pair of H2CY pulse is identical to the time between the earliest of those pulses and the H2CY pulse immediate preceding that pulse.

The other two signals of importance to the simulate 2-cycle mode of operation of the high frequency 2-cycle circuit 57 are T1G and S2C. S2C is normally low whereby FF5 is maintained in a reset state. When the simulate 2-cycle mode of operation is to be initiated the DTMF digit timing circuit causes S2C to go high. Just prior to, or simultaneously with, S2C going high, the DTMF digit timing circuit causes T1G to go high. As long as these signals remain high, the simulate 2-cycle mode of operation is enabled.

As a result of S2C and T1G going high, the $\overline{Q}$ output of FF5 shifts low, whereby G6 is disabled. Hence, the combined outputs of FF1, FF2 and FF4 are not applied to G9. At the same time G5 is enabled. As HCOMP pulses occur, they cause pulses to be formed on the output of G5. These pulses in turn form a pulse train on the output of G9. As a result an H2CY pulse train is simulated for the period of time that T1G and S2C are high. Termination of the T1G and S2C high states causes the high frequency, 2-cycle circuit to revert to its "normal" mode of operation. It will be appreciated from the foregoing discussion that, in essence, the simulate 2-cycle mode of operation is a recycle mode of operation, i.e., it is a mode wherein essentially the same information or data is recycled between the high frequency short term test circuit and the high frequency 2-cycle circuit.

HRST, is a reset signal produced by the high frequency long term counter under one of several conditions, hereinafter described. Normally HRST is low; when it goes high FF5 is reset, whereby, if the 2-cycle mode of operation is in effect, it is terminated.

Since the low frequency 2-cycle circuit is identical to the high frequency 2-cycle circuit, and operates in the same manner it will not be described in detail, except to note that HRST is also applied to that circuit rather than an equivalent LRST signal.

High and Low Frequency Short Term Test Circuits

Figure 6:
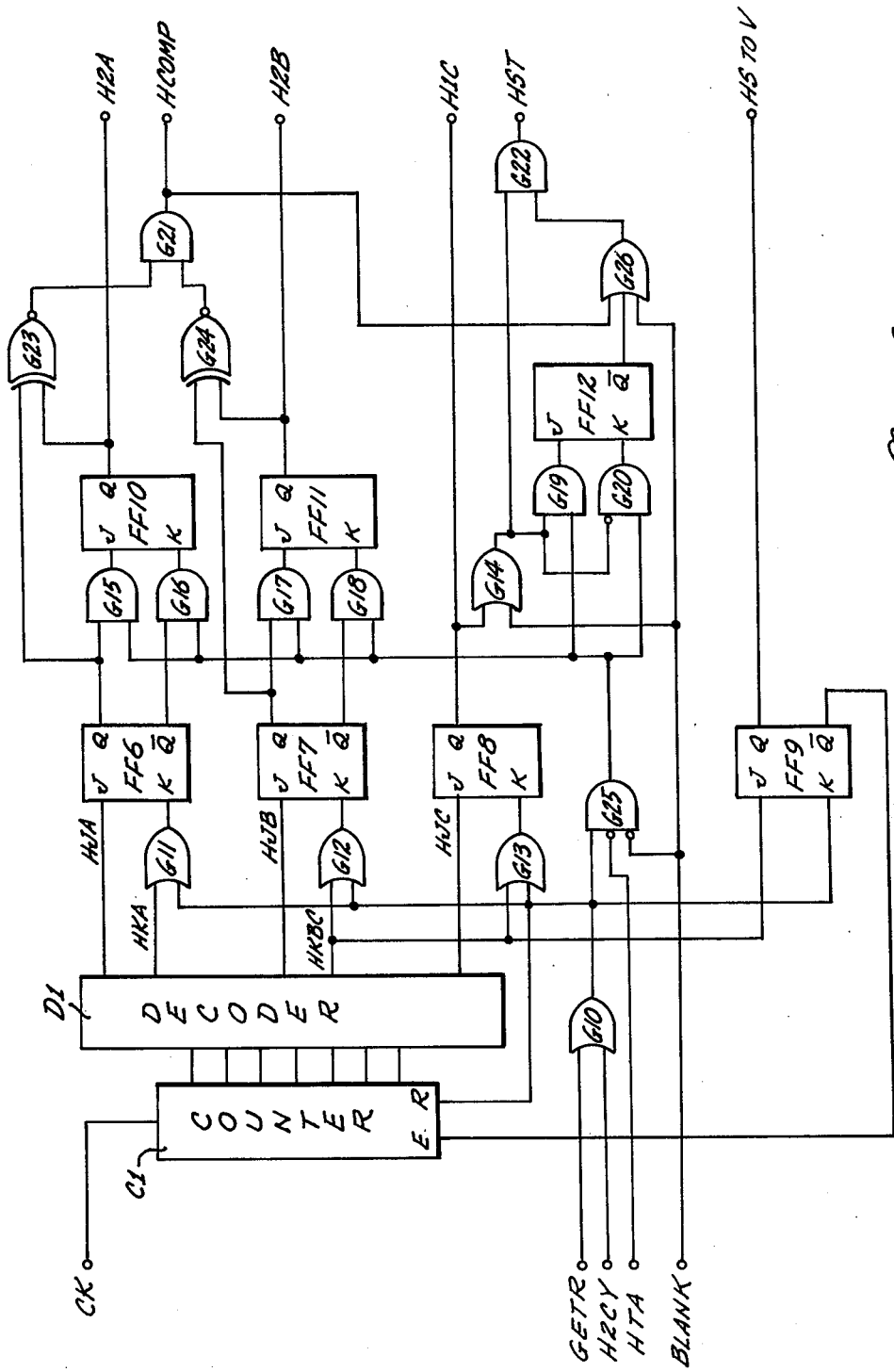
FIG. 6 is logic diagram of a high frequency, short term test circuit suitable for use in the DTMF subsystem illustrated in FIG. 3.

FIG. 6 is a logic diagram of a high frequency short term test circuit suitable for use in the high frequency channel circuit 51 of the DTMF subsystem illustrated in FIG. 3, and comprises: a counter designated C1; a decoder designated D1; seven JK flip-flops designated FF6 - FF12; five two-input OR gates designated G10 - G14; eight two-input AND gates designated G15 - G22 (G20 has one I-input); two two-input exclusive NOR gates designated G23 and G24; one three-input AND gate designated G25 (G25 has two I-inputs); and, a three-input OR gate designated G26.

C1 receives clock pulses from a suitable clock source, which, preferably is the same as the source supplying clock pulses to the various flip-flops. The outputs of the various stages of C1 are applied in parallel to the inputs of D1. D1 decodes the inputs and produces five pulse outputs designated HJA, HKA, HJB, HKBC, and HJC. HKA is the complement of HJA and HKBC is the complement of HJB. HJA is applied to the J input of FF6, and HKA is applied to one input of G11. HJB is applied to the J input of FF7 and HKBC is applied to one input of G12, one input of G13 and the J input of FF9. HJC is applied to the J input of FF8.

GETR and H2CY are applied to the two inputs of G10. The output of G10 is connected to the second input of G11, the second input of G12, the second input of G13, the reset input of C1, one input of G25 and the K input of FF9. The output of G11 is connected to the K input of FF6, the output of G12 is connected to the K input of FF7 and the output of G13 is connected to the K input of FF8.

A high tone accept signal, designated HTA and produced by the high frequency long term test circuit G1 in the manner hereinafter described is applied to one of the I-inputs of G25. A blanking signal designated BLANK and produced by the DTMF digit-timing circuit 25 in the manner hereinafter described is applied to the other I-input of G25, to one input of G14 and to one input of G26.

The output of G25 is connected to one input each of G15, G16, G17, G18, G19 and G20. The Q output of FF6 is connected to the second input of G15 and the $\bar{Q}$ output of FF6 is connected to the second input of G16. The Q output of FF7 is connected to the second input of G17 and the $\bar{Q}$ output of FF7 is connected to the second input of G18. The output of G15 is connected to the J input of FF10 and the output of G16 is connected to the K input of FF10. The output of G17 is connected to the J input of FF11 and the output of G18 is connected to the K input of FF11. The Q outputs of FF6 and FF10 are each connected to one input of G23. The Q outputs of FF7 and FF11 are each connected to one input of G24. The outputs of G23 and G24 are each connected to one of the inputs of G21. The Q output of FF10 is designated H2A and the Q output of FF11 is designated H2B. These signals are two bit binary signals whose states relate to the frequency of acceptable high frequency components (i.e., FH). The output of G21 is the HCOMP signal applied to the high frequency 2-cycle circuit in the manner previously described. HCOMP, goes high when the outputs of FF6 and FF10, and FF7 and FF11, respectively, are the same. In this regard, G23 and G24 form comparators that compare the outputs of FF6/FF10 and FF7/FF11, respectively. When both outputs compare, both inputs of G21 go high, whereby the output of G21 goes high. The high terminates shortly after being formed if an H2CY pulse occurs, because the H2CY pulse resets C1.

The Q output of FF8 is the H1C signal applied to G4 of the high frequency 2-cycle circuit illustrated in FIG. 5. The output of FF8 is also connected to the second input of G14. The output of G14 is connected to one input of G19, one input of G22 and the I-input of G20. The output of G19 is connected to the J input of FF12 and the output of G20 is connected to the K input of FF12. The $\bar{Q}$ output of FF12 is connected to the second input of G26. The output of G21 (HCOMP) is connected to the third input of G26. The output of G26 is connected to the second input of G22. The output of G22 is a high short term validity signal designated HST that is applied to the high frequency long term counter 61. As will be better understood from the following discussion of the operation of the high frequency short term test circuit, HST remains high as long as the high frequency short term test circuit determines that the high frequency component remains continuously valid during the 2-cycle (short term) validity tests.

The Q output of FF9 is a high short term overflow signal designated HSTOV. As long as D1 produces an output code denoting that the clock pulse count indicates that frequency of the high frequency component is above a minimum level (e.g., above 1209–60 or approximately 1150 Hz), HSTOV is low. When the frequency of the high frequency component drops below this predetermined level, HSTOV goes high.

The $\bar{Q}$ output of FF9 is applied to the enable input of C1. As a result, C1 remains enabled as long as HSTOV is low. When HSTOV goes high, the $\bar{Q}$ output of FF9 goes low, whereby C1 is disabled, i.e., prevented from counting further clock pulses.

Turning now to a more detailed description of the operation of the circuit illustrated in FIG. 6, as previously indicated, H2CY is a series of pulses. The first and each subsequent H2CY pulse resets C1 and FF6-FF9. In addition, assuming HTA and BLANK are low, each H2CY pulse enables G15-G18 and resets FF12. HTA is low prior to acceptance of the high frequency component. Thereafter HTA goes high. BLANK is low except during the simulate 2-cycle mode of operation of the high frequency 2-cycle circuit. During this mode of operation BLANK is high whereby G25 is disabled and HST is forced to remain high.

Between H2CY pulses, C1 counts clock pulses. The counted clock pulses are continuously decoded by D1 and the decoded result applied to FF6, FF7 and FF8. Thus, FF6, FF7 and FF8 store the decoded output of D1. In essence, the HJA, HKA, HJB, HJC and HKBC outputs of D1 are time interval signals, i.e., they are pulse signals that occur at predetermined intervals with HJC switching first. While various time intervals can be used, the following table denotes one suitable time interval arrangement (the count column denotes pulse counts based on a clock frequency of 223.7 kHz):

TABLE I

| MINEMONIC | TIME (ms) | COUNT |
|---|---|---|
| HJA | 1.28 | 287 |
| HKA | 1.57 | 351 |
| HJB | 1.42 | 318 |
| HKBC | 1.74 | 389 |
| HJC | 1.16 | 260 |
| (Count 0 coincident with H2CY) | | |

The next clock pulse after a H2CY pulse resets C1 and enables G15, G16, G17 and G18, shifts the output of FF6 and FF7 into FF10 and FF11 respectively. At the termination of the H2CY pulse (which occurs after the clock pulse) FF6, FF7 and FF8 are reset and the sequence is repeated. Just prior to the end of the each count sequence, if the period between the H2CY pulses has been the same, an HCOMP pulse will occur because the outputs of FF6 and FF10 and the outputs of FF7 and FF11 will be the same. An HCOMP pulse is produced in a similar manner at the end of each sequence, as long as the time period between adjacent H2CY pulses remains the same. Of course, H2A and H2B will remain the same as long as the time between H2CY pulse remains the same.

Should the number of pulses counted by C1 reach an equivalent value greater than the lowest FH frequency to be recognized (i.e., equal to 389, based on Table I), a HKBC pulse will occur. As a result, H1C will go low when the next clock pulse occurs. At the same time, HSTOV will go high to indicate the occurrence of an overflow. Further, HST will go low (as a result of HKBC going high) to note the invalidity results of the test. The low shift of H1C will disable the simulate operation of the high frequency 2-cycle circuit if it is that mode of operation. The low shifts of HSTOV and HST will cause cross-channel circuit resetting of the DTMF subsystem in the manner hereinafter described. A GETR pulse, of course, causes resetting action similar to that caused by H2CY pulses.

Since the low frequency short term test circuit is identical to the high frequency short term test circuit it will not be described in detail, except to point out that the following table sets forth a suitable, but not limiting, set of values for the decoder outputs.

TABLE II

| MINEMONIC | TIME (ms) | COUNT |
|---|---|---|
| LJA | 2.23 | 499 |
| LKA | 2.73 | 610 |
| LJB | 2.47 | 552 |
| LKBC | 3.02 | 675 |
| LJC | 2.02 | 451 |
| (Count 0 coincident with L2CY) | | |

High Frequency Long Term Counter

Figure 7:
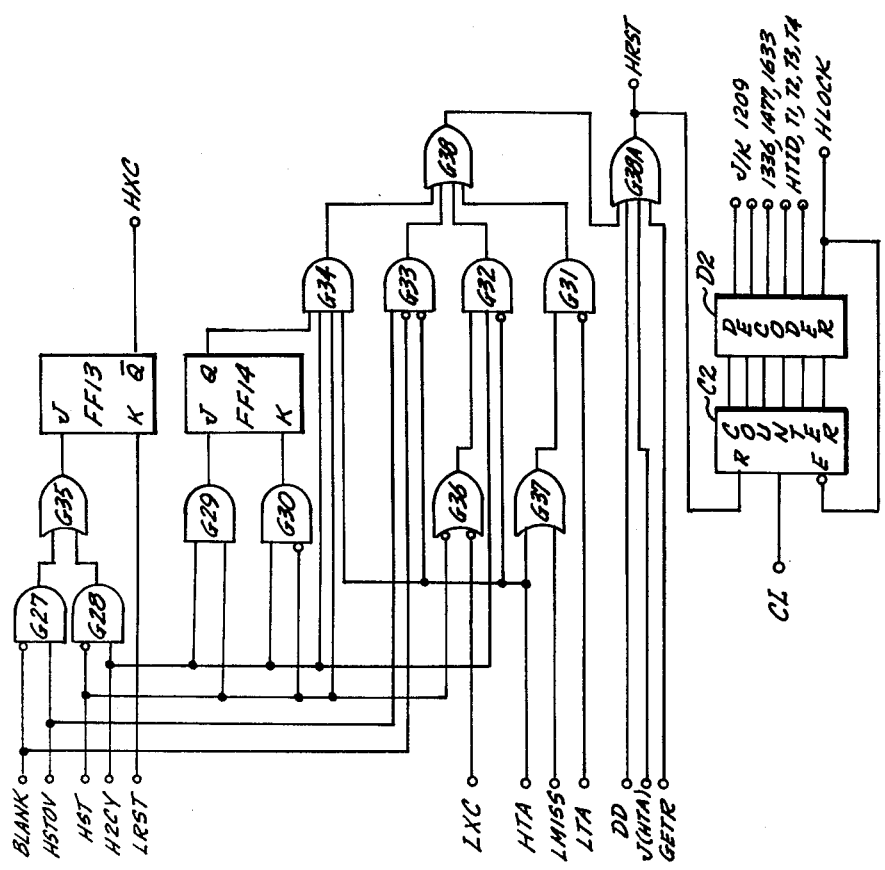
FIG. 7 is a logic diagram of a high frequency, long term counter suitable for use in the DTMF subsystem illustrated in FIG. 3.

FIG. 7 is a logic diagram of a high frequency long term counter suitable for use in the high frequency channel circuit 51 of the DTMF subsystem illustrated in FIG. 3 and comprises: two JK flip-flops designated FF13 and FF14; a counter designated C2; a decoder designated D2; five two-input AND gates designated G27 - G31 (G27, G28, G30, and G31 each have one I-input); two three-input AND gates designated G32 and G33 (G32 has one I-input and G33 has two I-inputs); a four-input AND gate designated G34; three two-input OR gates designated G35 - G37 (G36 has two I-inputs); and, two four-input OR gates designated G38 and G38A.

The BLANK signal, produced by the DTMF digit-timing circuit 55 in the manner hereinafter described, is applied to the I-input of G27 and to an I-input of G33. HSTOV is applied to an input of G27 and an input of G33. HST is applied to the I-input of G28, one input of G29, the I-input of G30, one input of G34 and an I-input of G36.

H2CY is applied to an input of G28, an input of G29, an input of G30, an input of G34 and an input of G32. The outputs of G27 and G28 are connected each to an input of G35; and the output of G35 is connected to the J input of FF13. A low channel circuit reset signal designated LRST and produced by the low frequency long term counter 69 in the manner hereinafter described, is applied to the K input of FF13. The $\bar{Q}$ output of FF13 is a high cross-channel circuit reset signal designated HXC. This signal is applied to the high frequency long term test circuit 63 and to the low frequency long term counter 69.

A low cross-channel circuit reset signal designated LXC and produced by the low frequency long term counter 69 is applied to the other I-input of G36. The output of G36 is connected to an input of G32. LXC is produced in a manner somewhat similar to the production of HXC as herein described. Normally LXC is low. As more fully hereinafter described, LXC goes high when the low frequency channel circuit determines that an invalid low frequency component is being received.

HTA is applied to one input of G37, an I-input of G32, the other I-input of G33 and one input of G34. A low frequency window miss signal designated LMISS and produced by the low frequency long term test circuit 71 is applied to the second input of G37. LMISS is normally low. As hereinafter described in more detail, LMISS shifts high when the low frequency long term test is failed.

A low tone accept signal designated LTA and produced by the low frequency long term test circuit 71, is applied to the I-input of G31. The outputs of G31, G32, G33 and G34 are each connected to one input of G38. The output of G38 is connected to one input of G38A.

A digit detect signal designated DD and produced by the low frequency long term test circuit 71 is applied to the second input of G38A. DD is low during the test sequence. DD goes high an interdigit time period after a valid DTMF digit has been detected. A high frequency accept pulse signal designated J(HTA) and produced by high frequency long term test circuit is applied to the third input of G38A; and, GETR is applied to the fourth input of G38A. J(HTA) as will be better understood from the following description of high frequency long term test circuit is a pulse that occurs when the high frequency component passes its long term test. GETR, of course, is the general tone reset signal produced by the main controller 25 and briefly discussed above.

The output of G38 is a high channel circuit reset signal designated HRST. This signal, as previously discussed, is applied to the high frequency 2-cycle circuit (FIG. 5). In that circuit, HRST resets FF5 when it goes high. The output of G38A (HRST) is connected to the reset input of C2. A clock pulse train having a predetermined frequency rate, preferably the same frequency as the frequency of the clock pulses applied to the flip-flops, is applied to the clock input of C2. The parallel outputs of the various stages of C2 are connected to the inputs of D2. D2 decodes these clock signals and, in accordance therewith produces a plurality of "window" control pulse signals designated J1209, J1336, J1477, J1633, K1209, K1336, K1477 and K1633. The J and K prefixes denote allied relationships based on the numerical suffix relationships. D2 also produces four time pulse signals designated T1, T2, T3 and T4; and a high frequency interdigit time pulse signal designated HTID. Finally, D2 produces a high frequency counter reset signal designated HLOCK. HLOCK is an enable signal applied to the enable input of C2. In addition, HLOCK is a back up reset signal that is applied to the DTMF digit timing circuit and used in the manner hereinafter described. Normally HLOCK is low. HLOCK goes high and disables C2, well after all the other outputs of D2 have cycled through an entire sequence of operation. While various times can be used, as desired, a table of suitable J/K, T1, T2, T3, T4 and HTID pulse times are set forth below:

TABLE III

| MNEMONIC | TIME (ms) | COUNT |
|---|---|---|
| J1209 | 25.92 | 5799 |
| K1209 | 27.03 | 6048 |
| J1336 | 26.41 | 5909 |
| K1336 | 27.49 | 6151 |
| J1477 | 26.55 | 5940 |
| K1477 | 27.63 | 6181 |
| J1633 | 26.43 | 5914 |
| K1633 | 27.47 | 6145 |
| HTID | 22.00 | 4922 |
| T1 | 6.82 | 1526 |
| T2 | 22.73 | 5085 |
| T3 | 15.91 | 3559 |
| T4 | 9.94 | 2224 |
| (Count 0 coincident with HRST) | | |

Prior to the receipt of the first H2CY pulse of a DTMF created pulse train, all of the inputs illustrated in FIG. 7 are low. As a result, only G32 is enabled. When the first H2CY pulse occurs C2 is reset since the H2CY pulse causes a pulse to occur on the output of G32. Thereafter, HST goes high, whereby G32 is disabled. The first H2CY pulse also sets FF13, if it was previously in a reset state. Thus, HXC is forced low. Assuming that no other reset pulses occurs, C2 will count clock pulses; and, at appropriate counts the J/K, T and HTID outputs of D2 will pulse, preferably in accordance with the values listed in Table III. Any one of a number of situations will cause C2 to be reset. For example, LMISS or HTA going high while LTA is low will cause C2 to be reset (HTA going high, of course, means that sequence has been completed and the FH component found to be acceptable). A H2CY pulse with a low LXC or HST and a low HTA will cause C2 to be reset, as will a high HSTOV in combination with HTA and BLANK being low. Finally if HST and HTA are high when a H2CY pulse occurs C2 will be reset.

This situation occurs after the high frequency tone has been found valid, i.e., both short and long term checks have been passed, and remains present until the high freqency component terminates, i.e., as long as the DTMF button is depressed. As a result, C2 is reset at the H2CY rate after the high frequency component has been found to be valid, until the telephone button is released. This function is significant because it prevents HTID after a high frequency component has been found valid, until the button is released. Finally, when the normal decode sequence is complete HLOCK goes high whereby C2 is disabled until it is reset.

High Frequency Long Term Test Circuit

Figure 8:
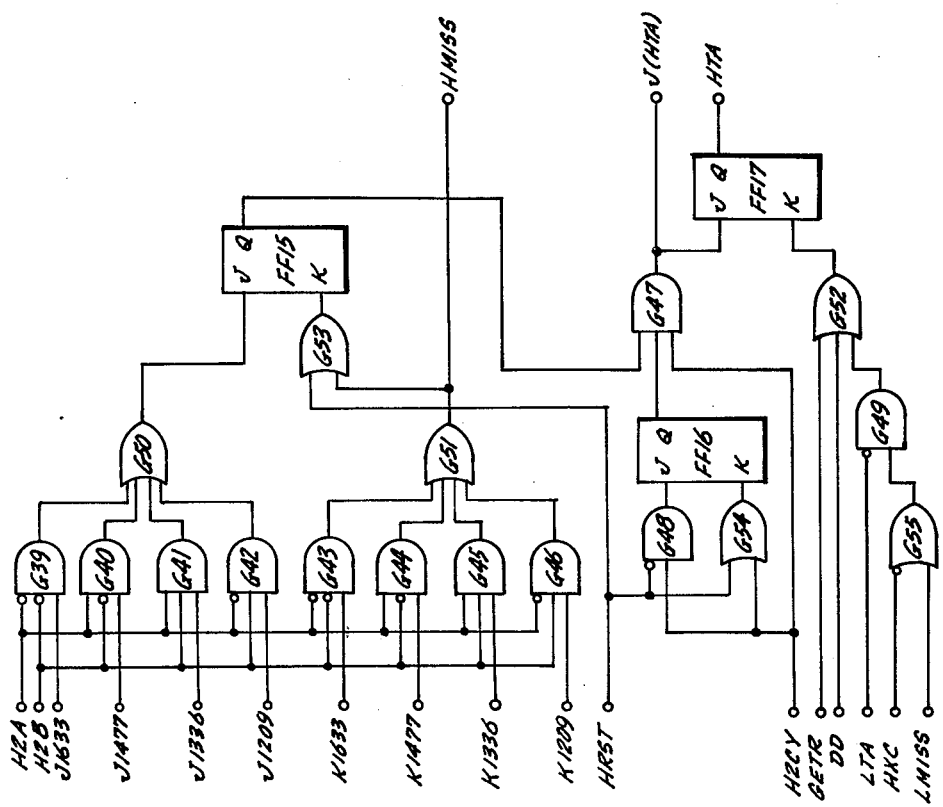
FIG. 8 is a logic diagram of a high frequency, long term test circuit suitable for use in the DTMF subsystem illustrated in FIG. 3.

FIG. 8 is logic diagram of a high frequency long term test circuit suitable for use in the high frequency channel circuit 51 illustrated in FIG. 3 and comprises: three JK flip-flops designated FF15, FF16 and FF17; nine three-input AND gates designated G39 - G47 (G39 and G43 each have two I-inputs and G40, G42, G44 and G46 each have one I-input); two two-input AND gates designated G48 and G49 (both G48 and G49 have one I-input); two four-input OR gates designated G50 and G51; one three-input OR gate designated G52; and three two-input OR gates designated G53, G54 and G55(G55 has one I-input).

H2A is applied to one input of each of G40, G41, G44, and G45 and to an I-input of each of G39, G42, G43 and G46. H2B is applied to one input of each of G41, G42, G45 and G46 and to an I-input of each of G39, G40, G43 and G44. J1633 is applied to the remaining input of G39; J1477 is applied to the remaining input of G40; J1336 is applied to the remaining input of G41; and J1209 is applied to the remaining input of G42. K1633 is applied to the remaining input of G43; K1477 is applied to the remaining input of G44; K1336 is applied to the remaining input of G45; and K1209 is applied to the remaining input of G46.

The outputs of G39 - G42 are each connected to one input of G50 and the output of G50 is connected to the J input of FF15. The outputs of G43 - G46 are each connected to one input of G51, and the output of G51 is connected to one input of G53. HRST is applied to the second input of G53. The output of G53 is connected to the K input of FF15. The Q output of FF15 is connected to one input of G47. The signal on the output of G51 is denoted HMISS. During the open window period HMISS is low. When the window ends by timing out HMISS goes high for one clock period.

HRST is also applied to the I-input of G48 and to an input of G54. H2CY is applied to the other inputs of G48 and G54. The output of G48 is connected to the J input of FF16 and the output of G54 is connected to the K input of FF16. The Q output of FF16 is connected to the second input of G47 and H2CY is applied to the third input of G47. The output of G47 is the J(HTA) signal applied to G38A of the high frequency long term counter (FIG. 7). The output of G47 is connected to the J input of FF17. GETR is applied to one input of G52 and DD is applied to the second input of G52. LTA is applied to the I-input of G49 and HXC is applied to the I-input of G55. LMISS is applied to the other input of G55. The output of G55 is connected to the other input of G49 and the output of G49 is connected to the third input of G52. The output of G52 is connected to the K input of FF17. The Q output of FF17 is the HTA signal applied to the high frequency short term test circuit (FIG. 6) and to the high frequency long term counter (FIG. 7) previously described.

As will be readily understood from the foregoing description and from viewing FIG. 8, the states of H2A and H2B enable one of G39 - G42 and one of G43 - G46. Specifically, if H2A and H2B are both high G41 and G45 are enabled; if H2A and H2B are both low G39 and G43 are enabled; if H2A is high and H2B is low, G40 and G44 are enabled; and, if H2A is low and H2B is high G42 and G46 are enabled. Since the states of H2A and H2B denote the frequency of the high frequency component as determined by the short term tests, they enable a pair of gates related to that frequency. These gates control the window period. Assuming H2A is low and H2B is high, when the J1209 output of D2 goes high, the output of G42 goes high and FF15 is set. Thereafter, when the K1209 output of D2 goes high FF15 is reset. As a result the Q output of FF15 is high for 1.11 ms, based on the times set forth in Table III. A similar "window" period is established for each of the other sets of J/K outputs of D2, with the chosen window being determined by the states of H2A and H2B. During this "window" period G47 is enabled, assuming that HRST is low and that FF16 is in an even numbered toggle state. In this regard, as will be readily appreciated by those skilled in the digital logic art, when highs are applied to both of the inputs of a JK flip-flop, the flip-flop will change states (toggle) upon the occurrence of the next clock pulse. Consequently, after either an HRST pulse or the first H2CY pulse occurs to reset FF16 each subsequent H2CY pulse will cause FF16 to toggle or change states. As a result on each even number H2CY pulse, FF16 will be set, i.e., its Q output will be high. If a H2CY pulse occurs when the window is open and FF16 is set a J(HTA) pulse will be formed. When such a pulse is formed, the long term test has been passed. If a J(HTA) pulse does not occur before the window closes HMISS goes high to indicate that the long term test has not been passed. The J(HTA) pulse causes FF17 to set whereby HTA goes high to indicate that the FH component has been accepted. FF17 is reset by either a GETR or a DD pulse. FF17 is also reset if either HXC goes low or LMISS goes high while LTA is low.

A J(HTA) pulse also causes C2 of the high frequency long term counter (FIG. 7) to be reset. And, the high HTA enables G34 of the high frequency long term counter so that C2 is reset on each H2CY pulse, until the telephone button is released and the H2CY pulses terminates.

Low Frequency Long Term Counter

The low frequency long term counter illustrated in FIG. 9 comprises: a JK flip-flop designated FF18; a counter designated C3; a decoder designated D3; four two-input AND gates designated G56 - G59 (G57, G58 and G59 each have one I-input); two three-input AND gates designated G60 and G61 (G60 has one I-input and G61 has two I-inputs); one four-input AND gate designated G62; three two-input OR gates designated G63 - G65 (both inputs of G64 are I-inputs); and, two four-input OR gates designated G66 and G66A.

The LST signal produced by the low frequency short term test circuit 67 is applied to: one input of G56; the I-input of G58; one input of G62; and, an I-input of G64. BLANK is applied to the I-input of G57 and an I-input of G61. LSTOV is applied to the second input of G57 and to an I-input of G61. LTA is applied to: one input of G62; one input of G65; and, an I-input each of G60 and G61. HXC is applied to the other I-input of G64. L2CY is applied to one input each of G56, G58, G60 and G62. HMISS is applied to the second input of G65. HTA is applied to the I-input of G59. DD, J(LTA) and GETR are each applied to one input of G66A.

The output of G56 is connected to the J input of FF18. The outputs of G57 and G58 are each connected to one of the inputs of G63; and, the output of G63 is connected to the K input of FF18. The Q output of FF18 is the low-cross-channel circuit reset signal designated LXC. In addition to being applied to the high frequency long term counter (FIG. 7) as described above, LXC also applied to the low frequency long term test circuit 71 (FIG. 10) as hereinafter described. The Q output of FF18 (LXC) is connected to the fourth input of G62. The output of G64 is connected to the remaining input of G60; and, the output of G65 is connected to the other input of G59. The outputs of G59 - G62 are each connected to one input of G66. The output of G66 is connected to the fourth input of G66A.

The output of G66A is a low channel circuit reset signal designated LRST. LRST is applied to the low frequency long term test circuit 71, as hereinafter described, as well as to the high frequency long term counter, as previously described. The output of G66A (LRST) is connected to the reset (R) input of C3. C3 also receives clock pulses from a suitable clock source, such as the source applying clock pulses to the flip-flops and other counters herein described. The parallel outputs of C3 are connected to the inputs of D3. As with D2 (FIG. 7), D3 produces a plurality of pulse output signals. These signals are designated J697, J770, J852 and J941; K697, K770, K852 and K941; LTID and LLOCK. The J and K prefixes indicate that they are allied forms of the signals denoted by their particular suffixes. LLOCK pulses well after the other signals shift states during a sequence of operation. LLOCK is applied to the enable input of C3. As long as LLOCK is low C3 is enabled. When LLOCK pulses C3 is disabled.

C3 and D3 operate in a manner identical to the operation of C2 and D2, in that C3 counts pulses after an LRST pulse resets C3. J697, J770, J852, J941, K697, K770, K852 and K941 occur at predetermined time intervals to control "window" periods. LTID, which stands for low interdigit time, corresponds to HTID and is used only after the released button is released to produce a DD pulse in the manner hereinafter discussed with respect to FIG. 10. The following table is illustrative of time related pulses suitable for use by the invention:

TABLE IV

| MNEMONIC | TIME (ms) | COUNT |
|---|---|---|
| J697 | 28.01 | 6266 |
| K697 | 29.41 | 6580 |
| J770 | 27.91 | 6244 |
| K770 | 29.26 | 6545 |
| J852 | 27.54 | 6161 |
| K852 | 28.83 | 6449 |
| J941 | 27.02 | 6045 |
| K941 | 28.25 | 6321 |
| LTID | 22.00 | 4922 |

(Count 0 Coincident with LRST)

Low Frequency Long Term Test Circuit

FIG. 10 illustrates a low frequency long term test circuit suitable for use in the low frequency channel circuit 53 illustrated in FIG. 3 and comprises: two JK flip-flops designated FF 19 and FF20; eight three-input AND gates designated G67 - G74 (G67 and G71 each have two I-inputs, and G68, G70, G72 and G74 each have one I-input); four two-input AND gates designated G75 - G78 (G76 has one I-input); two four-input OR gates designated G79 and G80; one three-input OR gate designated G81; and three two-input OR gates designated G82 - G84 (G83 has one I-input).

L2A is applied to an I-input of each of G67, G70, G71 and G74; and, to an input of each of G68, G69, G72 and G73. L2B is applied to an I-input of each of G67, G68, G71 and G72; and, to a input of each of G69, G70, G73 and G74. J941 is applied to the remaining input of G67; J852 is applied to the remaining input of G68; J770 is applied to the remaining input of G69; and, J697 is applied to the remaining input of G70. K941 is applied to the remaining input of G71; K852 is applied to the remaining input of G72; K770 is applied to the remaining input of G73; and, K697 is applied to the remaining input of G74.

The outputs of G67 - G70 are each connected to one input of G79 and the output of G79 is connected to the J input of FF19. The outputs of G71 - G74 are each connected to input of G80; and, the output of G80 is connected to one input of G82. LRST is applied to the second input of G82. The output of G82 is connected to the K input of FF19. The output of G80 is the signal designated LMISS, which is applied to the high frequency long term counter 61 and the high frequency long term test circuit 63, as previously described.

The Q output of FF19 is connected to one input of G75. L2CY is applied to the second input of G75. The output of G75 is the signal designated J(LTA), which is applied to: the high frequency long term counter 61; the high frequency long term test circuit 63; the low frequency short term test circuit; the low frequency; long term counter 69; and, the DTMF digit-timing circuit 55. The output of G75 is connected to the J input of FF20.

GETR is applied to one input of G81. LXC is applied to the I-input of G83; and, HMISS is applied to the other input of G83. The output of G83 is connected to an input of G76. HTA is applied to one input of G77 and the I-input of G76. The output of G76 is connected to the second input of G81. HTID is applied to the second input of G77. The output of G77 is connected to one input of G84. LTID is applied to one input of G78. The Q output of FF20, which is the LTA signal, is connected to the second input of G78. The output of G78 is connected to the second input of G84. The output of G84, which is the DD signal, is connected to the fourth input of G81. The output of G81 is connected to the K input of FF20.

LTA (low tone accept), in addition to being applied to the second input of G78, is also applied to: the high frequency long term counter 61; the high frequency long term test circuit 63; the low frequency short term test circuit 67; and, the low frequency, long term counter 69, as previously discussed. LTA is also applied to the DTMF digit-timing circuit 55. DD (digit detect) is applied to the high frequency long term counter 61 and the low frequency long term counter 69, as previously discussed. DD is also applied to the main controller 15, illustrated in FIG. 25 and hereinafter described.

The low frequency long term test circuit operates in a manner generally similar to the operation of the high frequency long term test circuit 63. More specifically L2A and L2B enable one of G67 - G70 and one of G71 - G74. Thereafter, when the pulse count counted by C3 reaches an appropriate level the related J output of D3 shifts high, whereby FF19 is set. Thereafter, when the related K input goes high, FF19 is reset. During the period of time FF19 is set (e.g., the "window" period) G75 is enabled. If a L2CY pulse occurs during this period a J(LTA) pulse occurs and FF20 is set. When FF20 is set. When FF20 is set LTA goes high to indicate the acceptance of the low frequency component. If no L2CY pulse occurs, LMISS goes high, and both the high and low channel circuits are reset. FF20 is reset by: GETR going high; LXC going low or HMISS going high when HTA is low; or by DD going high. DD goes high either when HTA and HTID are both high or when LTA and LTD are both high. In this regard, after HTA or LTA go high neither an HTID nor a LTID pulse, respectively, will occur until the button of the telephone is released because the H2CY and L2CY pulses, respectively, will reset C2 and C3, respectively, as discussed above. Thus, DD goes high only after a button is released. DD will go high even if the next button depression causes one of FH and FL to be the same as for the previous button depression because the nonsimilar FH or FL component will be different, whereby the related HTID or LTID pulse will occur.

DTMF Digit Timing Circuit

Figure 11:
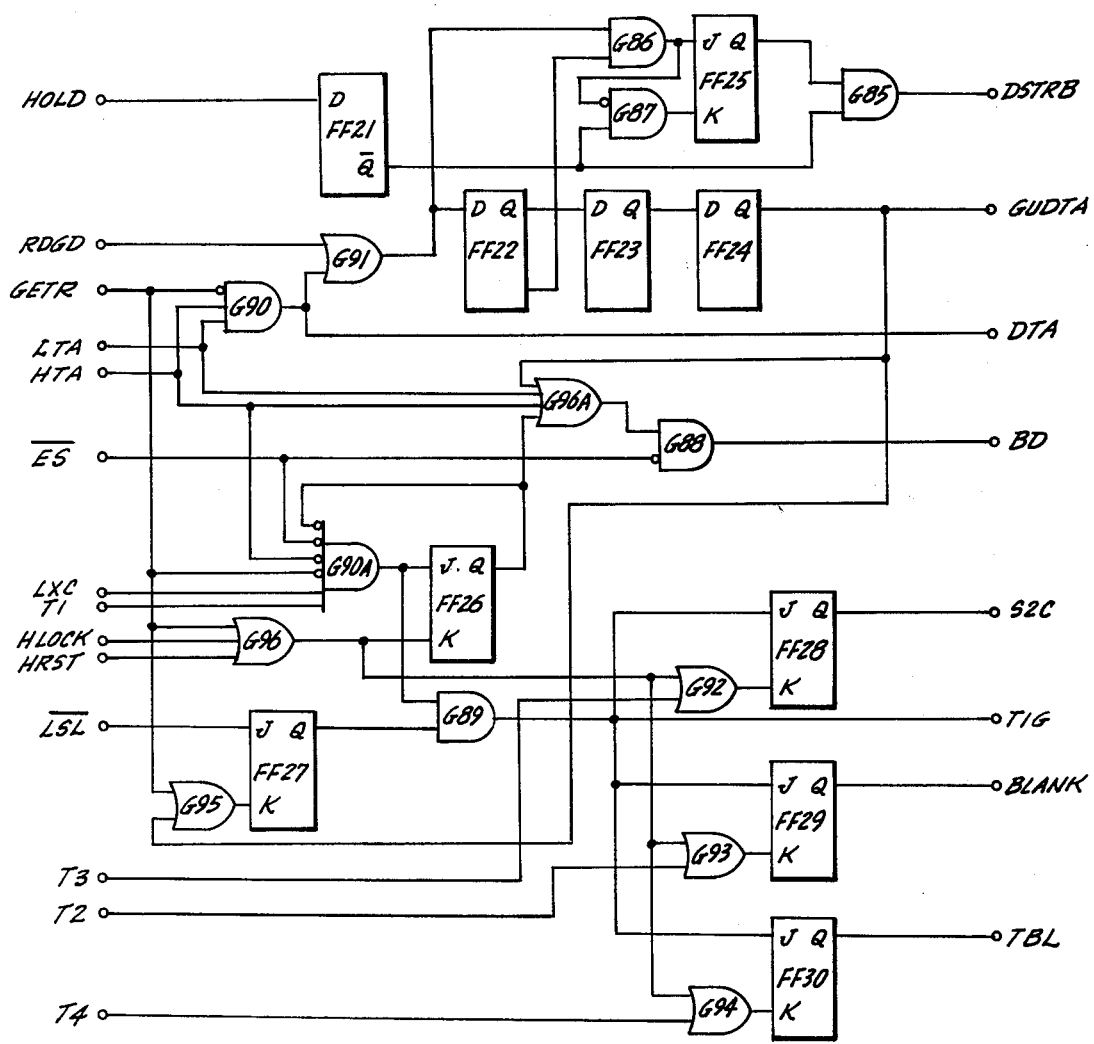
FIG. 11 is a DTMF digit timing circuit, suitable for use in the DTMF subsystem illustrated in FIG. 3.

FIG. 11 is a logic diagram of a DTMF digit timing circuit suitable for use in the DTMF subsystem illustrated in FIG. 3 and comprises: four D flip-flops designated FF21 - FF24; six JK flip-flops designated FF25 - FF30; five two-input AND gates designated G85 - G89 (G86, G87 and G88 each have one I-input); one three-input AND gate designated G90 (G90 has one I-input); one six-input AND gate designated G90A (G90A has four I-inputs); five two-input OR gates designated G91 - G95; one three-input OR gate designated G96; and one four-input OR gate designated G96A.

GETR is applied to an I-input of each of G90 and G90A and to one input of each of G95 and G96. HOLD is applied to the D input of FF21; and the $\bar{Q}$ output of FF21 is connected to one input of each of G87 and G85. The output of G87 is connected to the K input of FF25.

RDGD is applied to one input of G91. LTA is applied to one input of each of G90 and G96A. HTA is applied to one input of each of G90, and G96A; and to an I-input of G90A. The output of G90 is a dual tone accept signal designated DTA. The shift of this signal high denotes the acceptance of both the high and low frequency components. The output of G90 (DTA) is connected to the second input of G91; and, the output of G91 is connected to one input of G86 and the D input of FF22. The $\bar{Q}$ output of FF22 is connected to the second input of G86; and, the output of G86 is connected to the J input of FF25. The Q output of FF25 is connected to the second input of G85. The output of G85 is a data strobe signal designated DSTRB.

The Q output of FF22 is connected to the D input of FF23 and the Q output of FF23 is connected to the D input of FF24. The Q output of FF24 is a signal denoting the presence of good data and is designated GUDTA. GUDTA goes high three clock pulse periods after good rotary dial data is detected, as denoted by RDGD going high; or, after good DTMF data is detected, as denoted by both HTA and LTA going high. In the latter case GUDTA goes high three clock pulses after the last one of LTA and HTA goes high. As illustrated in FIG. 1 and discussed above GUDTA is a signal that is applied to other circuitry to denote the availability of good data for read out. The Q output of FF24 (GUDTA) is applied to the third input of G96A and the second input of G95. The output of G95 is connected to the K input of FF27.

$\overline{ES}$, which is an external signal that enables the early split operation of the invention when it is low is applied to an I-input of each of G88 and G90A. LXC is applied to one input of G90A and T1 is applied to another input of G90A. The output of G90A is connected to the J input of FF26 and to one input of G89. The Q output of FF26 is connected to the remaining I-input of 90A and to the fourth input of G96A. The output of G96A is connected to the second input of G88. The output of G88 is a buttons down signal designated BD.

HLOCK, produced by the high frequency long term counter illustrated in FIG. 7, is applied to the second input of G96. HRST is applied to the third input of G96. The output of G96 is connected to the K input of FF26 and to one input of each of G92, G93 and G94. $\overline{LSL}$, which is an external signal denoting the state of the line-split latch, is connected to the J input of FF27 (when $\overline{LSL}$ is high, the line is not split; when $\overline{LSL}$ is low, the line is split). The Q output of FF27 is connected to the second input of G89. The output of G89 is the T1G signal applied to the high and low frequency, 2-cycle circuits 57 and 59. The output of G89 (T1G) is applied to the J inputs of FF28, FF29 and FF30.

T3 is applied to the second input of G92; and, the output of G92 is connected to the K input of FF28. T2 is applied to the second input of G93; and, the output of G93 is connected to the K input of FF29. T4 is applied to the second input of G94; and, the output of G94 is connected to the K input of FF30. T1, T2, T3 and T4 are produced by D2 (FIG. 7), as previously described. The Q output of FF28 forms the S2C signal applied to the high and low frequency 2-cycle circuits to enable the 2-cycle mode of operation previously described. The Q output of FF29 is the BLANK signal applied to the high and low frequency long term test circuits, during the period of time that the 2-cycle simulated mode of operation is in effect. The Q output of FF30 is the TBL signal, which advises external circuitry that the simulate 2-cycle mode of operation is in effect.

In operation, as previously described, when both the high and low frequency components, FH and FL, pass both their short and long term tests, both HTA and LTA go high. Since GETR will be low (unless a general reset is being commanded by the main controller) the output of G90 will go high, whereby FF25 will be set causing a DSTRB pulse to occur (unless HOLD is high, which will only occur if the digital receiver is being commanded to hold data). The DSTRB pulse, as will be better understood from the following description of the output register and decoder 31 (FIG. 16), causes DTMF or rotary dial data to be latched into the output register and decoder. Shortly thereafter GUDTA goes high to advise downstream circuits that valid data is ready for readout. (In this regard, RDGD, which goes high when valid rotary dial pulses are detected as hereinafter described, functions that same as combined HTA and LTA high inputs with respect to the operation of FF25, e.g., providing a DSTRB pulse, and causing GUDTA to subsequently go high.)

Combined HTA and LTA both going high cause DTA to go high. When DTA goes high, the main controller is informed that an acceptable DTMF signal has been received.

As soon as any one of LTA, HTA or GUDTA, goes high or an early split flip-flop (FF26) is set, BD goes high, assuming that the early split mode of operation of the dial signal receiver is enabled, e.g., $\overline{ES}$ is low. BD going high causes the downstream line split latch to split the line. Normally, the setting of FF26 causes BD to go high. As discussed below, FF26 is set when T1 goes high, which occurs shortly after the first H2CY pulse is produced, as previously discussed with respect to FIG. 7. Obviously, the same effect could be produced by the first L2CY pulse by deriving T1 from an appropriate output of D3 rather than D2.

With respect to the early split mode of operation, G89 is enabled if $\overline{LSL}$ is high, indicating that the line is not split. Looking at the inputs of G90A, during early split HTA will be low, GETR will be low $\overline{ES}$ will be low and, prior to being set, the Q output of FF26 will be low. LXC will be high unless an appropriate failure has been sensed. As a result when T1 goes high, which may occur within 7 ms of the HRST reset pulse (see Table III), TIG goes high. At the same time FF26, FF28, FF29 and FF30 are set. FF26 will remain set until HLOCK goes high or another HRST pulse occurs. When T2 shifts high FF29 is reset; when T3 shifts high FF28 is reset; and, when T4 shifts high FF30 is reset. Alternately any one of HLOCK HRST or GETR shifting high will reset FF28, FF29 and FF30. FF27 is reset by either GUDTA shifting high or GETR shifting high when $\overline{LSL}$ is low, indicating that the line is split.

Rotary Dial Subsystem

Turning now to a description of the rotary dial subsystem 23 illustrated in FIG. 1. This subsystem comprises a loop current timer 81, a rotary dial converter 83 and a dial pulse counter 85, illustrated respectively in FIGS. 12, 13 and 14. The connection of these circuit elements together and to the main controller and the output register is illustrated in FIG. 4.

As will be readily understood by those skilled in the telephone art, rotary dial pulses are formed by breaks in loop current (LC). Each break of suitable duration identifies a dial pulse; and, a series of breaks identifies a digit. When a break in loop current is detected $\overline{LC}$ goes high. $\overline{LC}$ is applied to the loop current timer. If $\overline{LC}$ remains high for a suitable time period (e.g., 1-2 ms), the loop current timer starts to count clock pulses. After certain predetermined time periods, if $\overline{LC}$ remains high, timed control signals shift high. These control signals are detected by the rotary dial controller 83. In accordance therewith, the rotary dial controller advances the dial pulse counter 85. At the end of a series of dial pulses, the rotary dial controller advises the DTMF digit timing circuit (by RDGD going high) that all of the pulses for a digit have been received and a related code is ready for transfer to the output register and decoder. The output register and decoder is then strobed, by a DSTRB pulse produced in the manner previously described, and reads the digit code. In accordance therewith, the output register produces a related parallel output code on its output lines (DATA 0-11). The following description sets forth in detail the nature and operation of a loop current timer, a rotary dial controller and a dial pulse counter suitable for use in forming the rotary dial subsystem.

Loop Current Timer

Figure 12:
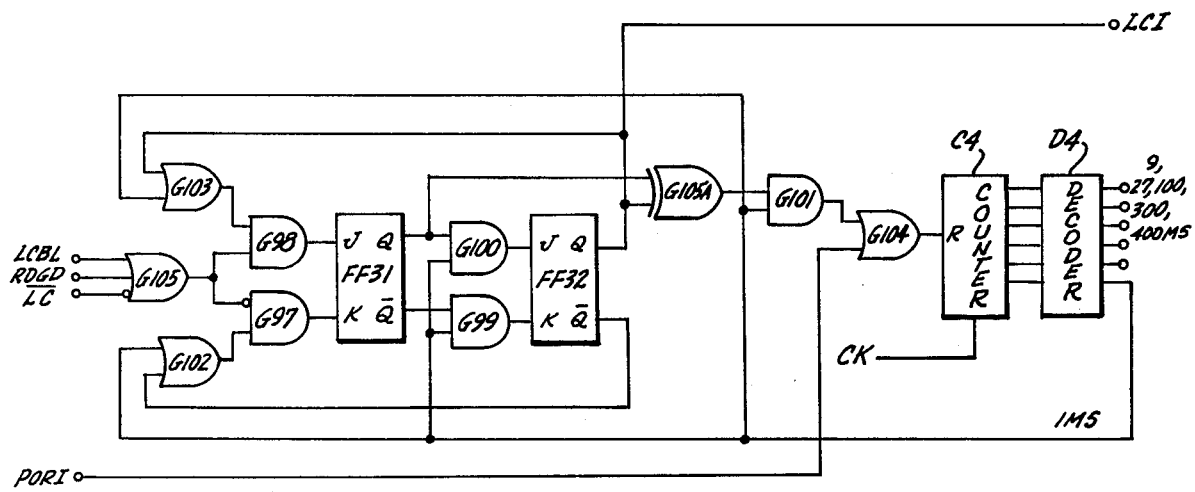
FIG. 12 is a logic diagram of a loop current timer, suitable for use in the rotary dial subsystem illustrated in FIG. 4.

FIG. 12 illustrates a loop current timer formed in accordance with the invention and comprises: two JK flip-flops designated FF31 and FF32; five two-input AND gates designated G97-G101 (G97 has one I-input); three two-input OR gates designated G102-G104; a three-input OR gate designated G105 (G105 has one I-input); a two-input exclusive OR gate designated G105A; a counter designated C4; and, a decoder designated D4.

A loop current blanking signal designated LCBL and produced by the main controller is applied to one input of G105. Normally, LCBL is low. When it is desired to inhibit the operation of a loop current timer 81 LCBL goes high. RDGD is applied to the second input of G105. As previously discussed RDGD shifts high when valid rotary dial data has been detected. Thus, at the beginning of a dial pulse detection sequence RDGD is low. $\overline{LC}$ is applied to the I-input of G105. As long as LCBL and RDGD are low the output of G105 follows fluctuations in $\overline{LC}$.

The output of G105 is connected to one input of G98 and to the I-input of G97. The output of G98 is connected to the J input of FF31 and the output of G97 is connected to the K input of FF31. The Q output of FF31 is connected to one input of G100 and the $\overline{Q}$ output of FF31 is connected to one input of G99. The output of G100 is connected to the J input of FF32 and the output of G99 is connected to the K input of FF32. The signal at the Q output of FF32 is an internal loop current signal designated LCI, which is applied to the rotary dial controller and the main controller as hereinafter described. The Q output of FF32 is connected to one input of G103 and one input of G105A. The Q output of FF31 is connected to the second input of G105A. The $\overline{Q}$ output of FF32 is connected to one input of G102. The output of G105A is connected to one input of G101; and, the output of G101 is connected to one input of G104. An internal power on reset signal denoted PORI, which is a pulse signal produced by the main controller when power is applied to the dial signal receiver of the invention, is applied to the second input of G104.

The output of G104 is connected to the reset input of C4. Clock pulses (CK) produced by a suitable clock source such as the source driving the flip-flops and other counters herein described is applied to the clock input of C4. The outputs of the stages of C4 are connected to D4.

C4 is basically a free-running counter that is reset to zero when the output of G104 goes through a reset transition. This transition may be the result of a PORI pulse or the result of a pulse occurring on the output of G101, produced in the manner hereinafter described. Thereafter, a C4 counts pulses and the decoder decodes the outputs of the counter, producing low to high output pulses at predetermined time intervals. Preferably these intervals are at 1 millisecond, 9 milliseconds, 27 milliseconds, 100 milliseconds, 300 milliseconds, and 400 milliseconds. Of these outputs, the 1 ms output is applied to the second inputs of G99, G100, G101, G102 and G103. The other outputs are applied to the rotary dial controller (FIG. 13) and the main controller (FIG. 15) in the manner hereinafter described.

Since C4 is free-running, the 1 ms output of D4 enables G99, G100 and G101 at a 1 ms rate. G102 and G103 are also enabled at a 1 ms rate, except on the alternate half-cycle of the waveform since G102 and G103 are OR gates, whereas G99, G100 and G101 are AND gates.

In operation, assuming that the loop current timer is enabled, LCBL is low. RDGD is also low, prior to a valid series of dial pulses being detected. Thus, G105 is enabled such that its output follows $\overline{LC}$. Prior to the line being seized, of course, $\overline{LC}$ is high, whereby the output of G105 is low since the Q outputs of FF31 and FF32 are also low the output of G105A is low and C4 is free running. When a telephone goes OFF-HOOK, $\overline{LC}$ goes low, C4 is reset as a result of the outputs of FF31 and FF32 becoming different for a one ms interval. Until a break in loop current occurs to indicate the presence of a dial pulses, $\overline{LC}$ is low, whereby the output of G105 is high. As a result, the Q outputs of FF31 and FF32 are high and the output of G105A is low. Consequently G101 is disabled and C4 again recirculates.

When a break in loop current occurs, $\overline{LC}$, goes high and the output of G105 goes low. This low is clocked into FF31 and, then, FF32. Consequently, at some point in time, within a 1-2 ms period, the Q outputs of FF31 and FF32 are different, i.e., the Q output of FF31 is low, while the Q output of FF32 is high. As a result, the output of G105A is high; and, G101 is enabled. The next 1 ms pulse passes through G101 and resets C4. At the same time, the Q outputs of FF31 and FF32 become the same, i.e., low, whereby the output of G105A goes low and G101 is again disabled. In a similar manner, C4 is reset when loop current is restored at the end of a pulse. In this case, a high is clocked into FF31 prior to being clocked into FF32. During the period of time the Q outputs of FF31 and FF32 are different C4 is reset.

The foregoing discussion, of course, assumes that the output of G105 remained low for the 1-2 ms period of time necessary for that output to be clocked into FF31. If the output of G105 returns high prior to the 1 ms pulse occurring, the shift in $\overline{LC}$ is ignored. In this manner, short extraneous breaks in loop current are prevented from being detected.

Subsequently to being reset, as long as the output of G105 remains low, C4 will count clock pulses; and, D4 will decode the count. After 9 ms, the 9 ms output of D4 will pulse. Similarly after the elapse of their related time periods the 27, 100, 300 and 400 ms outputs of D4 will pulse high, assuming C4 is not reset prior to the end of the noted time interval. These outputs are analyzed by the rotary dial controller. Based on these outputs, in the manner hereinafter described, the rotary dial controller determines if valid pulses and a valid digit have been detected. In this regard, a pulse is considered valid, if $\overline{LC}$ remains high for at least 27 ms followed by 9 ms of $\overline{LC}$ going low after it has been high for at least 27 ms. The end of a digit is recognized if $\overline{LC}$ is low for 100 ms.

Rotary Dial Controller

FIG. 13 is a logic diagram of a rotary dial controller suitable for use in the rotary dial subsystem illustrated in FIG. 4 and comprises: three JK flip-flops designated FF33, FF34 and FF35; seven two-input AND gates designated G106-G112; four three-input AND gates designated G113-G116; one four-input AND gate designated G117; one two-input OR gate designated G118; three three-input OR gates designated G119-G121; and, three inverters designated I1-I3.

The LCI output of the loop current timer (FIG. 12) is applied to one input of G113, one input of G114, one input of G108, one input of G116 and one input of G117; and, through I2 to one input of G106, one input G115 and one input of G109. An OFF-HOOK signal designated OFF-HOOK and produced by the main controller in the manner hereinafter described, is applied to one input of G107; and, through I1 to one input of G119. The 100 ms output of D4 is applied to the second input of G114. A rotary dial inhibit control signal designated $\overline{RDI}$ and also produced by the main controller in the manner hereinafter described is applied to the second input of G115. The 27 ms output of D4 is applied to the third input of G115 and to the second input of G109. A rotary dial enable signal designated RDNBL and also produced by the main controller is applied through I3 to one input of G121 and one input of G120. The 300 ms output of D4 is applied to the second input of G121 and to one input of G110. The 9 ms output of D4 is applied to the second input of G117.

The outputs of G106 and G113 are each connected to one input of G118 and the output of G118 is connected to the second input of G107. The output of G107 is connected to the J input of FF33. The outputs of G114 and G108 are each connected to one of the remaining inputs of G119. The output of G119 is connected to the K input of FF33.

The output of G115 is connected to the J input of FF34. The output of G116 is connected to the third input of G121 and the output of G121 is connected to the K input of FF34. The outputs of G109 and G110 are each connected to one of the remaining inputs of G120. The output of G120 is connected to the K input of FF35.

The Q output of FF33 is a signal designated RD to denote the presence of potentially valid rotary dial information. When RD shifts high, downstream circuitry is advised of the presence of potentially valid rotary dial information. The $\overline{Q}$ output of FF33 is connected to one input of G112, the second input of G110 and the third input of G116. The Q output of FF34 is connected to the third inputs of G117, G113 and G114. The $\overline{Q}$ output of FF34 is connected to the second input of G106, the second input of G108, and one input of G111. The Q output of FF35 is connected to the second input of G112. The $\overline{Q}$ output of FF35 is connected to the second input of G111, the fourth input of G117, the third input of G116 and the third input of G113. The output of G117 is connected to the J input of FF35.

The output of G117 is a rotary dial advance signal designated RDADV. When a RDADV pulse is produced in the manner hereinafter described, it causes the dial pulse counter (FIG. 14) to advance. The output of G111 is a rotary dial clear signal designated RDCLR. This output is also applied to the dial pulse counter 85. When an RDCLR pulse is produced in the manner hereinafter described, it causes the rotary dial pulse counter 85 to clear. The output of G112 is the rotary dial good data signal designated RDGD. As previously described RDGD is applied to the DTMF digit timing circuit (FIG. 11) and causes a DSTRB pulse, followed by GUDTA shifting to a high state.

Turning now to a detailed discussion of the operation of the rotary dial controller illustrated in FIG. 13; in this regard, $\overline{RDI}$ must be high for the rotary dial controller to function at all. The rotary dial controller is initially enabled when RDNBL goes high. More specifically, when power is first applied RDNBL is low, whereby the output of I3 is high, resulting in FF34 and FF35 being reset. After a short period of time, if the rotary dial controller is to be enabled RDNBL shifts high. Assuming loop current is present when FF34 is reset, FF33 is also reset via G108 and G119. Alternatively FF33 is reset whenever OFF-HOOK goes low, whereby the output of I1 is high. (OFF-HOOK goes low whenever all telephones are on-hook, i.e., the related telephone is not being seized.) As a result, initially RD is low, RDADV is low, RDGD is low and RDCLR is high. As a result of RDCLR being high, the dial pulse counter (FIG. 14) is held in a clear state.

The main controller recognizes when a customer goes off-hook, and in the manner hereinafter described causes OFF-HOOK to go high. When OFF-HOOK goes high, G107 is enabled. However, FF33 remains in a reset state since the outputs of G107 and G119 remain low and high, respectively. As soon as a break in loop current is recognized by the loop current timer (FIG. 12), LCI shifts low, whereby G108 is disabled and the K input of FF33 goes low. Simultaneously, the output of G106 and, thus, the J input of FF33 goes high. Consequently, on the next clock pulse FF33 is set and RD goes high.

If LCI remains low for 27 ms, a high is clocked into the J input of FF34, whereby FF34 is set and RDCLR goes low. (Should FF35 not be reset at this period of time, as a result of the prior detection of a valid digit, it is immediately reset by the high on the output of G109 passing through G120 to the K input of FF35.)

When loop current is again restored, indicating the end of a dial pulse, three of the inputs to G117 are high (the Q output of FF34, LCI and the $\bar{Q}$ output of FF35). 9 ms after loop current is restored, and C4 is reset as previously described, the 9 ms input to G117 pulses, whereby the output of G117 (RDADV) pulses. This RDADV pulse causes the dial pulse counter to count up by one dial pulse. The shift of RDADV high, also causes the Q output of FF35 to shift low, whereby G117 is disabled. Disabling G117 terminates the RDADV pulse, if not previously terminated.

When the next dial pulse occurs LCI again shifts low, and the output of 12 shifts high. 27 ms thereafter, both of the inputs of G109 are high, whereby FF35 is reset. When FF35 is reset, its Q output applies a high to the related input of G117. 9 ms after LCI returns to its high state (which indicates the end of the dial pulse), the output of G117 produces a second RDADV pulse. This pulse, as with the first pulse, is counted and causes FF35 to be reset, whereby the rotary dial controller is conditioned to detect the next (third) dial pulse. The foregoing sequence continues until all of the rotary dial pulses of a particular digit have been received and caused RDADV pulses to occur. It should be noted that, while the described embodiment of the invention only considered dial pulses to be valid if breaks in loop current exceed 27 ms and if the restoration time interval following such a break exceeds 9 ms, obviously, other time intervals can be chosen, if desired.

After all of the dial pulses for a particular digit have been detected, FF35 remains set. Approximately 100 ms thereafter, all of the inputs of G114 are high. As a result, FF33 is reset; and, RD goes low. At the same time the $\bar{Q}$ input of FF33 to G112 will go high. Since both of the inputs to G112 are now high, RDGD will go high, whereby the receipt of good rotary dial data is denoted. As previously discussed, a high RDGD causes DSTRB pulse to occur and GUDTA to shift high.

Approximately 300 milliseconds after the last digit is received, the 300 ms input to G121 will go high. As a result, FF34 will be reset. In addition, the 300 ms high shift, via G110, which is now enabled due to the $\bar{Q}$ output of FF3 being high, will reset FF35. As a result, RDCLR with shift high and the dial pulse counter will be cleared. Also, the rotary dial controller will be conditioned to receive pulses related to the next digit.

FIG. 13A is a state diagram illustrating the operation of the rotary dial controller illustrated in FIG. 13 and described above, and is intended to make the operation of the rotary dial controller more readily understood. FIG. 13A illustrates the five main states, designated S1, S2, S3, S4 and S5, of the Q outputs of FF33, FF34 and FF35. For purposes of illustration, the Q output of FF35 is denoted A, the Q output of FF34 is denoted B and the Q output of FF35 is denoted C. The conditions causing the various transition paths, denoted a, b, c, d, e, f and g and, to be followed are illustrated in the following table:

TABLE V

| Transition Path | LCI State | Time (ms) |
|---|---|---|
| a | 0 | 0 |
| b | 0 | 27 |
| c | 1 | 9 |
| d | 0 | 27 |
| e | 1 | 100 |
| f | either | 300 |
| g | 1 | 27 |

As illustrated in FIG. 13A, the rotary dial controller is in state S1 when A, B and C are low. This is the quiescent state of this subsystem. As soon as loop current is lost, i.e., LCI goes low, A goes high and the subsystem moves to S2 along path a. If LCI remains low for 27 ms, the rotary dial controller moves to S3 along path b. (If LCI goes high before the end of the 27 ms period the rotary dial controller returns to S1 along path g.) 9 milliseconds after the end of the dial pulse, the rotary dial controller shifts to S4 along path c. 27 ms after the start of the next dial pulse, the rotary dial controller returns to S3 along path d. Thereafter, the rotary dial controller continues to cycle between S3 and S4 until all of the dial pulses for a particular digit have been counted. 100 ms after the last pulse has been counted, the rotary dial controller shifts to S5 along path e. 200 milliseconds thereafter (for a total of 300 ms from the end of the last dial pulse), the rotary dial controller returns to S1. Thereafter the dial pulses relating to the next digit cause the rotary dial controller to recycle through its various states.

Dial Pulse Counter

FIG. 14 is a logic diagram of a dial pulse counter 85 (FIG. 4) formed in accordance with the invention and comprises: four JK flip-flops designated FF36-FF39; three two-input AND gates designated G122, G123 and G124; five three-input AND gates designated G125-G129; and, four two-input OR gates designated G130-G133.

The advance pulse output (RDADV) of the rotary dial controller is applied to one input each of G125, G126, G127, G128, G122, G129, G123 and G124. The clear pulse output (RDCLR) of the rotary dial controller is applied to one input each of G130, G131, G132 and G133. The output of G125 is connected to the J input of FF36, the output of G126 is connected to the second input of G130 and the output of G130 is connected to the K input of FF36. The output of G127 is connected to the J input of FF37. The output of G128 is connected to the second input of G131 and the output of G131 is connected to the K input of FF37. The output of G122 is connected to the J input of FF38. The output of G129 is connected to the second input of G132 and the output of G132 is connected to the K input of FF38. The output of G123 is connected to the J input of FF39. The output of G124 is connected to the second input of G133 and the output of G133 is connected to the K input of FF39.

The Q output of FF36, which is a rotary dial data signal designated RDA, is applied to the second input of G128. The $\bar{Q}$ of FF36 is connected to the second input of G127. The Q output of FF37, which is a rotary dial data signal designated RDB, is applied to the second input of G125 and the second input of G129. The $\bar{Q}$ output of FF37 is connected to the second input of G126. The Q output of FF38, which is a rotary dial data signal designated RDC, is applied to the second input of G124. The $\bar{Q}$ output of FF38 is connected to the third input of G127. The Q output of FF39, which is a rotary dial data signal designated RDD, is applied to the second input of G122. The $\bar{Q}$ output of FF39 is connected to the second input of G123, the third input of G129, the third input of G128, the third input of G126 and the third input of G125.

The dial pulse counter is a pulse counter wherein the states of RDA, RDB, RDC and RDD denote the number of pulse counted subsequent to the counter being cleared. The following table sets forth the states of RDA, RDB, RDC and RDD for the ten digits of a rotary dial telephone:

TABLE VI

|  | D | C | B | A |
|---|---|---|---|---|
| Clear | 0 | 0 | 0 | 0 |
| 1 | 1 | 0 | 1 | 0 |
| 2 | 1 | 1 | 1 | 0 |
| 3 | 0 | 1 | 1 | 0 |
| 4 | 1 | 0 | 1 | 1 |
| 5 | 1 | 1 | 1 | 1 |
| 6 | 0 | 1 | 1 | 1 |
| 7 | 1 | 0 | 0 | 1 |
| 8 | 1 | 1 | 0 | 1 |
| 9 | 0 | 1 | 0 | 1 |
| 0 | 1 | 1 | 0 | 0 |

The basis equations for the dial pulse counter are as follows:

$$SA = B \cdot \bar{D}; RA = \bar{B} \cdot D$$

$$SB = \bar{A} \cdot \bar{C}; RB = A \cdot \bar{D}$$

$$SC = B; RC = B \cdot \bar{D}$$

$$SD = \bar{D}; RD = C$$

where the S prefix denotes the set state of the related flip-flop and prefix R denotes the reset state, based on the outputs of FF36-FF34. In this regard A = Q output of FF36; $\bar{A}$ = $\bar{Q}$ output of FF36; B = Q output of FF37; etc.

Main Controller

FIG. 15 is a logic diagram of a main controller suitable for use in the dial signal receiver of the invention. The main controller illustrated in FIG. 15 comprises: a D flip-flop designated FF40; three JK flip-flops designated FF41, FF42 and FF43; three inverters designated I4, I5 and I6; eleven two-input AND gates designated G134-G144 (G142 and G143 each have one I-input); two three-input AND gates designated G145 and G146; one four-input AND gate designated G147; one two-input NAND gate designated G148; four two-input OR gates designated G149-G152; one three-input OR gate designated G153; one four-input OR gate designated G154; a decoder designated D5; and, a power detection circuit designated P1.

P1 senses the application of power (POR) to the digital receiver of the invention and, in accordance therewith produces a pulse (PORI) at its output. This pulse starts at the beginning of the rise in the input voltage and ends when the voltage reaches its steady state value. PORI, in addition to being applied to the loop current timer (FIG. 12), as previously described, is also applied to the D input of FF40. In accordance with the receipt of a PORI pulse, the Q output of FF40 denoted POROUT goes high, in sync with the next clock pulse applied to FF40. As previously discussed, a POROUT pulse can be used for initialization (reset) purposes by downstream circuitry. The output of P1(PORI) is also applied to one input of G149.

The 100 ms and LCI outputs of the loop current timer (FIG. 12) are each applied to one input of G134. The output of G134 is connected to the J input of FF41. LCI is also applied through I4 to one input of G135 and one input of G145. The 300 ms output of the loop current timer is applied to the second input of G135 and to one input of G145. The output of G135 is connected to the second input of G149, and the output of G149 is connected to the K input of FF41. The output of G149 is also connected to one input of G152 and one input of G154.

The digit detect (DD) output of the low frequency long term test circuit (FIG. 10) is applied to one input of G146 and one input of G137. RDI, the external control signal whose state controls whether or not the rotary dial subsystem is or is not inhibited, is applied through I5 to one input each of G137, G145, G146. The output of I5 is also the $\overline{RDI}$ signal applied to the rotary dial controller (FIG. 13) in the manner previously described.

The 400 ms pulse output of the loop current timer (FIG. 12) is applied to one input of G139. The 27 ms output of the loop current timer is applied to the third input of G145. The DTA output of the DTMF digit timing circuit (FIG. 11) is applied to one input of G136. DTI, the external control signal whose state controls whether or not the DTMF subsystem is or is not inhibited is applied to one input of G144 and through I6 to one input of G136 and one input of G147. The RDGD output of the rotary dial controller (FIG. 13) is applied to the third-input of G147. CLEAR, the external clear control signal previously described, is applied to one input of G154, one input of G153 and the I-inputs of G142 and G143. HTA and LTA produced by the high and low frequency long term test circuits (FIG. 8 and FIG. 10, respectively) in the manner previously described are each applied to one input of G148. The output of G148 is connected to the second input of G144. The output of G144 is connected to the second input of G153.

The output of G145 is connected to one input of G150 and the output of G136 is connected to the second input of G150 and to one input of G140. The output of G137 is connected to the third input of G154 and the output of G147 is connected to the fourth input of G154. The output of G150 and the Q output of FF41 are each connected to one input of G138 and the output of G138 is connected to the J input of FF42. The output of G154 is connected to the K input of FF42.

The Q output of FF41 is also connected to the most significant bit (MSB) input of D5 and to one input of G141. The Q output of FF42 is connected to the second most significant bit input of D5 and to the third input of G146. The $\overline{Q}$ output of FF42 is connected to the second input of G139 and to the second input of G140. The outputs of G146 and G139 are each connected to one input of G151. The output of G151 is connected to the second input of G141 and the output of G141 is connected to the J input of FF43. The output of G140 is connected to the second input of G152 and the output of G152 is connected to the K input of FF43. The Q output of FF43 is connected to the least significant bit (LSB) input of D5. The Q output of FF43, which is a control signal designated MCC that is applied to the output circuit hereinafter described, is also connected to the fourth input of G147.

D5 is a three to four decoder that decodes the Q outputs of FF41, FF42 and FF43. In accordance with the state of these flip-flops, four outputs are either low or high. The conditions controlling the states of these outputs are hereinafter described. The first output is the loop current blanking signal, LCBC, applied to loop current timer (FIG. 12) as previously described. The second output is connected to an input of G142. The output of G142 is the rotary dial enable signal, RDNBL, applied to the rotary dial controller (FIG. 13) as previously described. The third output of D5 is connected to an input of G143. The output of G143 is the off-hook signal, OFF-HOOK, also applied to the rotary dial controller as previously described. OFF-HOOK is also applied to the output register and decoder as hereinafter described. The fourth output of D5 is applied to the third input of G153. The output of G153 is the general tone reset signal, GETR, applied to the DTMF subsystem as previously described.

Turning now to a discussion of the operation of the main control illustrated in FIG. 15, the PORI pulse occurring on the output of P1 resets FF41, FF42 and FF43. This occurs because the pulse occurring on the output of P1 flows through G149 to the K input of FF41 and, then, through G152 to the K input of FF43 and through G154 to the K input of FF42. As long as all related telephones remain ON-HOOK, FF41, FF42 and FF43 remain in their reset states. This set of conditions is decoded such that OFF-HOOK is low. 100 ms after loop current is found to be present, as a result of a telephone going off-hook, FF41 is set because the output of G134 pulses. This set of conditions (e.g., FF41 set and FF42 and FF43 reset) is decoded by D4 and causes LCBL to go high. This occurrence makes the controller temporarily insensitive to loop current breaks. 400 ms thereafter, FF43 is set because at this point in time, the output of G139 pulses whereby the output of G141 pulses (assuming FF41 was previously set as a result of the detection of loop current). When FF43 is set, LCBL returns low. The main controller is now in its idle or waiting state and will respond to loop current breaks. The main controller normally returns to this state after each DTMF or rotary dial digit detection sequence.

As previously discussed, the dial signal receiver can be set to handle either rotary dial (RD), DTMF (DT) signals or both. Which functions are enabled are determined by the states of RDI and DTI. Both types of informaton will be processed if both the RDI and DTI inputs to the main controller are low. If the RDI input is high, the system will be inhibited for processing rotary dial information. If the DTI input is high, the system will be inhibited from processing DTMF information.

Assuming both the DTI and RDI inputs are low, and assuming, initially, that both the FH and FL components of a DTMF signal have been received and found acceptable, as previously described DTA will go high. As a result, both inputs to G136 will be high. Since FF42 is reset when the output of G136 goes high FF43 is reset, via G140 and G152. At the same time, since FF41 is set, FF42 is set via G150 and G138. When FF43 is reset, MCC goes low, which action enables the output register and decoder, illustrated in FIG. 16 and hereinafter described, to receive the high frequency and low frequency tone codes (H2A, H2B, L2A, L2B), produced in the manner previously described. Since RDI is low, the main controller returns to its wait state (FF41 set, FF42 reset and FF43 set) as soon as DD pulse occurs. DD pulses at the end of the high and low frequency interdigit time periods (when either a HTID or a LTID pulse occurs, as previously discussed). When the next digit is found acceptable DTA again goes high and the system cycles again. Alternatively, if RDI were high, MCC would remain low and the system would be reset only if loop current were lost for 300 ms.

Assuming next that the information detected is rotary dial, as opposed to DTMF, when the subscribe's telephone goes OFF-HOOK, the system cycles to the wait state in the same manner as before, whereby FF41 is set, FF42 is reset and FF43 is set. Thereafter, when a dial pulse causes a loss of loop current for 27 milliseconds, FF42 is set, via G145, G150 and G138, whereby all three flip-flops are set. Dial pulses are then counted in the manner previously described. 300 ms after the last dial pulse is received, assuming RDGD goes high (indicating the receipt of good rotary dial data), FF42 is reset. Thereafter, the first dial pulse of the next series causes FF42 to be set and the series to be counted. This cycling continues until all digit pulse series have been received and counted. If loop current is lost for 300 ms at any time all three flip-flops are reset and the system cycles back to the ON-HOOK state.

As previously discussed LCBL goes high for a short period of time after loop current is detected. Assuming CLEAR is low, RDNBL is high except when all subscribers are ON-HOOK and when DTMF information is being processed. At these times RDNBL is low. Assuming CLEAR is low, OFF-HOOK is high except when all subscribers are ON-HOOK. The D5 input to G153 is high only when all subscribers are ON-HOOK or rotary dial information is being processed. At all other times the input to G153 is low.

FIG. 15A is a state diagram of the main controller illustrated in FIG. 15, showing the five main states of operation. The Q outputs of FF41, FF42 and FF43 are denoted A, B. and C. The various transition paths are illustrated by a, b, c, d, e, f, g, h, j and k. S1 is the ON-HOOK state; S2 is the BLANK state; S3 is the WAIT state; S4 is the DT (dual tone) state; and, S5 is the RD (rotary dial) state. As just discussed, when power is applied to the main controller, it enters S1, and A, B and C are all low. After a subscriber goes OFF-HOOK and loop current is present for 100 ms, transition path a is followed, i.e., A goes high while B and C remain low, whereby S2, the BLANK state, is entered. 400 ms after loop current is detected, assuming the BLANK state was entered, transition path b is followed and S3, the WAIT state, is entered into. In this state, A is high, B is low and C is high. Thereafter, either transition path c or transition path e can be followed. If transition path c is followed, the main controller enters the S4, (DT) state, i.e., A and B are high and C is low. If transition path e is followed, the S5 (RD) states is entered, i.e., A, B and C are all high. Which path is followed, of course, depends upon whether or not rotary dial or DTMF information is received. Regardless of which information is received, the system will cycle between the WAIT state, S3, and that state, S4 or S5, as digits are detected, via paths c-d or paths e-f. Should loop current be lost for 300 ms at anytime the main controller is in the DT, WAIT or RD states, it will immediately cycle back to the S1 (ON-HOOK) state via paths g, h, or j, as appropriate. In addition, if DTMF information is received while the main controller is in the S4 (BLANK) state, it will immediately shift to the DT state and not pass through the S3 (WAIT) state. In other words, if DTA goes high prior to the S3 (WAIT) state being achieved, path k will be followed, as opposed to path b followed by path c.

The equations set forth below denote the conditions causing the various transition paths to be followed:

$a = LCI \cdot 100$ ms $b = 400$ ms $c,k = DTA \cdot \overline{DTI}$ $d = DD \cdot \overline{RDI}$ $e = \overline{LCI} \cdot 27 \text{ ms} \cdot \overline{RDI}$ $f = RDGD \cdot 300 \text{ ms} \cdot \overline{DTI}$ $g,h,j = \overline{LCI} \cdot 300$ ms

Output Register and Decoder

FIG. 16 is a logic diagram of an output register and decoder suitable for use in the embodiment of the invention illustrated in FIG. 1 and comprises: sixteen two-input AND gates designated G155-G170 (G155, G157, G159, G161, G164, G166, G168 and G170 each have one I-input); eight two-input OR gates designated G171-G178; an inverter designated I7; four JK flip-flops designated FF44-FF47; four D flip-flops designated FF48-FF51; and, a decoder designated D6.

H2B is applied to one input of G155 and RDD is applied to one input of G156. H2A is applied to one input of G157 and RDC is applied to one input of G158. L2B is applied to one input of G159 and RDB is applied to one input of G160. H2A is applied to one input of G161 and RDA is applied to one input of G162. MCC is applied to the I-inputs of each of G155, G157, G159 and G161 and to the second inputs of each of G156, G158, G160 and G162. The outputs of G155 and G156 each are connected to an input of G171; and, the outputs of G157 and G158 are each connected to an input of G172. The outputs of G159 and G160 are each connected to an input of G173; and, the outputs of G161 and G162 are each connected to an input of G174. The output of G171 is connected to one input of G163 and the I-input of G164. The output of G172 is connected to one input of G165 and the I-input of G166. The output of G173 is connected to one input of C167 and the I-input of G168. The output of G174 is connected to one input of G169 and the I-input of G170. DSTRB is applied to the other inputs of each of G163-G170.

The output of G163 is connected to the J input of FF44; the output of G165 is connected to the J input of GG45; the output of G167 is connected to the J input of FF46; and, the output of G169 is connected to the J input of FF47.

The output of G164 is connected to one input of G175, the output of G166 is connected to one input of G167, the output of G168 is connected to one input of G177 and the output of G170 is connected to one input G168. OFF-HOOK is applied through I7 to the other inputs of each of G175-G178. The output of G175 is connected to the K input of FF44; the output of G176 is connected to the K input of FF45; the output of G177 is connected to the K input of FF46; and, the output of G178 is connected to the K input of FF47. The Q outputs of FF44-FF47 are each connected to one input of D6.

FCA amnd FCB, which are external format control signals previously discussed, are applied to the D flip-flops. More specifically, FCA is applied to the D input of FF48 and the Q output of FF48 is applied to the D input of FF49. The Q output of FF49 is applied to a fifth input of D6. FCB is applied to the D input of FF50 and the Q output of FF50 is applied to the D input of FF51. The Q output of FF51 is applied to a sixth input of D6. Decoder D6 decodes its six inputs and, in accordance therewith, produces data in parallel form on twelve output lines designated DATA 0-DATA 11.

Turning now to a discussion of the operation of the output register and decoder illustrated in FIG. 16, it will be appreciated that the high or low state of MCC determines whether DTMF AND gates (G155, G157, G159 and G161) or the rotary dial information AND gates (G156, G158, G160 and G162) are enabled. If MCC is high, the rotary dial AND gates are enabled and rotary dial information (RDA, RDB, RDC and RDD) is received and processed. Contrariwise, if MCC is low, the DTMF AND gates are enabled and DTMF information (L2A, L2B, H2A and H2B) is received and processed. Regardless of which type of data is to be received, and processed, when DSTRB goes high, the data to be received and processed is strobed into FF44-FF47. These flip-flops function as latches that store the information to be decoded by D6 in accordance with a particular format control, determined by the states of FCA and FCB. FF44-FF47 are cleared when OFF-HOOK goes low. While various output formats can be used, as desired, three suitable data formats and a blank format illustrated in FIG. 17.

It will be appreciated that the format table illustrated in FIG. 17 covers not only the usual ten digits, the asterisk and numbers sign on a conventional pushbutton telephone, it allows the normal 3 × 4 pushbutton array denoting these items to be expanded to a 4 × 4 array whereby all of the potential high and low frequency tone combinations are utilized. As such the potential DTMF information is expanded. Similarly, a rotary dial pulse system can be expanded from the normal maximum ten pulse sequence to a sixteen pulse sequence.

Conclusion

It will be appreciated from the foregoing description that the invention provides a dial signal receiver suitable for receiving either DTMF or rotary dial information. The system is adapted to convert the received information into parallel digital data in a form that is useful by downstream circuitry. The parallel digital data can be utilized by downstream circuitry to recreate rotary dial pulses (enhanced rotary dial pulses). Alternatively, the parallel digital data can be utilized by downstream circuitry to create rotary dial type pulses, based on DTMF information. Still further, the parallel digital data can be used for purposes other than creating rotary dial type pulses. For example, the parallel digital data can be processed by a data processing system, if the parallel digital data contains information other than telephone information. Regardless of how used, the invention detemines whether or not the initial DTMF or rotary dial information is valid. IF valid, the information is accepted and used to create related parallel digital data. If the DTMF or rotary dial information is determined to be invalid, it is not processed by the digital receiver of the invention.

While a preferred embodiment of the invention has been illustrated and described, it will be appreciated that various changes can be made therein without departing from the spirit and scope of the invention. For example, it will readily be appreciated that a wide variety of the different types of logic systems can be utilized to carry out the basic functions of the invention. In addition, output formats and sequences of operation other than those specifically described can be used. Hence, the invention can be practiced otherwise than as specifically described herein.

The embodiments of the invention in which an exclusive property or privilege is claimed are defined as follows:

1. A dial signal receiver for receiving and decoding DTMF and rotary dial-type digit signals of the type produced by telephones and transmitted on telephone lines, said receiver comprising:
   a DTMF subsystem for: (i) receiving the high and low frequency components of a DTMF signal; (ii) determining if the frequency of each of said components is valid by performing independent short and long term frequency checks on each component; and, (iii) if both of said components are found to be valid, producing a DTMF digital code related to the nature of said DTMF signal;
   a rotary dial subsystem for: (i) receiving a signal denoting the presence and absence of telephone line loop current; (ii) determining if breaks in loop current, indicated by the absence of loop current, denote a valid rotary dial-type pulse train by measuring loop current intervals, and the restoration intervals between loop current break intervals; and, (iii) if a pulse train is found to be valid, producing a rotary dial digital code related to the number of pulses forming said pulse train;
   a main controller for receiving external control signals adapted to control the inhibiting of the operation of said DTMF subsystem and said rotary dial subsystem, said main controller connected to said DTMF subsystem and said rotary dial subsystem for inhibiting the operation of said DTMF subsystem and said rotary dial subsystem in accordance with said external control signals; and,
   an output register and decoder connected to said DTMF and said rotary dial subsystems for: (i) receiving said DTMF digital codes produced by said DTMF subsystem and said rotary dial digital codes produced by said rotary dial subsystem; and, (ii) producing an output digital code in accordance therewith.

2. A dial signal receiver as claimed in claim 1 wherein said output register and decoder is adapted to receive external format control signals, said external format control signals controlling the format of said output digital code.

3. A dial signal receiver as claimed in claim 2 wherein said high and low frequency short term frequency checks are continuously performed while said high and low frequency long term frequency checks are being performed.

4. A dial signal receiver as claimed in claim 3 wherein said DTMF subsystem is adapted to receive an early split control signal and, in accordance therewith, produce an early split output signal soon after a selected one of said high and low frequency components passes its first short term frequency check.

5. A dial signal receiver as claimed in claim 4 wherein said DTMF subsystem comprises:
   a high frequency channel circuit for performing said short and long term frequency checks on the high frequency component of said DTMF telephone signal; and,
   a low frequency channel circuit for performing said short and long term frequency checks on the low frequency component of said DTMF telephone signal.

6. A dial signal receive as claimed in claim 5 wherein said high and low frequency channel circuits are cross connected such that the failure of either of said short and long term frequency checks by either of said high and low frequency components causes both of said high and low frequency channel circuits to be reset.

7. A dial signal receiver as claimed in claim 6 wherein:
   said DTMF susbsystem includes a DTMF digit timing circuit, said DTMF digit timing circuit adapted to receive said external early split control signal and a condition signal denoting the line split status of a related telephone and, if said condition signal denotes that said line is not split, produce a simulate two-cycle signal, said simulate two-cycle signal being applied to said high and low frequency channel circuits;
   said high frequency channel circuit high frequency simulate means, responsive to said simulate two-cycle signal, for causing said high frequency channel circuit to operate in substantially the same manner as it would normally operate if an acceptable high frequency signal were being received, during the period of time said simulate two-cycle is being generated, regardless of the exact nature of any received high frequency component; and,
   said low frequency channel circuit includes low frequency simulate means, responsive to said simulate two-cycle signal, for causing said low frequency channel circuit to operate in substantially the same manner as it would normally operate if an acceptable low frequency signal were being received, during the period of time said simulate two-cycle signal is being generated, regardless of the exact nature of any received low frequency component.

8. A dial signal receiver as claimed in claim 7 wherein:
(A) said high frequency channel circuit comprises:
   (1) a high frequency two-cycle circuit suitable for receiving said high frequency components and, in accordance therewith, produce a high frequency pulse chain having a frequency equal to one-half the frequency off said high frequency component;
   (2) a high frequency short term test circuit connected to said high frequency two-cycle circuit so as to receive said high frequency pulse train, continuously compare the intervals between adjacent pulses of said pulse train and produce a portion of said DTMF digital code as long as the intervals between said adjacent pulses remains the same, said portion of said DTMF digital code being related to the frequency of said high frequency component;

(3) a high frequency long term counter connected to said high frequency two-cycle circuit so as to receive said high frequency pulse train and produce a series of window control signals starting at predetermined intervals after the first pulse of a high frequency pulse train is received by said high frequency long term counter; and, (4) a high frequency long term test circuit including a gate and a gate enabling subsystem, said gate enabling subsystem connected to said high frequency long term counter for receiving said window control signals and creating, in accordance therewith, a window enabling signal, said window enabling signal being related to the frequency of said high frequency pulse train, said window enabling signal applied to an enabling input of said gate, said gate also connected to said high frequency two-cycle circuit for receiving said high frequency pulse train, said gate passing a pulse of said high frequency pulse train if a pulse occurs during the period of time said gate in enabled by said window enabling signal, said pulse indicating that said high frequency component has passed both of said short and long term check; and, (B) said low frequency channel circuit comprises:

(1) a low frequency two-cycle circuit suitable for receiving said low frequency components and, in accordance therewith, produce a low frequency pulse chain having a frequency equal to one-half the frequency of said low frequency component;

(2) a low frequency short term test circuit connected to said low frequency two-cycle circuit so as to receive said low frequency pulse train, continuously compare the intervals between adjacent pulses of said pulse train and produce a portion of said DTMF digital code as long as the interval between said adjacent pulses remains the same, said portion of said DTMF digital code being related to the frequency of said low frequency component;

(3) a low frequency long term counter to said low frequency two-cycle circuit so as to receive said low frequency pulse train and produce a series of low frequency window control signals starting at predetermined intervals after the first pulse of said low frequency pulse train is received by said low frequency long term counter; and, (4) a low frequency long term test circuit including a gate and a gate enabling subsystem, said gate enabling subsystem connected to said low frequency long term counter for receiving said window control signals and creating, in accordance therewith, a window enabling signal, said window enabling signal being related to the frequency of said low frequency pulse train, said window enabling signal being applied to the enabling input of said gate, said gate also connected to said low frequency two-cycle circuit for receiving said low frequency pulse train, said gate passing a pulse of said low frequency pulse train if a pulse occurs during the period of time said gate is enabled by said window enabling signal, said pulse indicating that said low frequency component has passed both of said short and long term checks.

9. A dial signal receiver as claimed in claim 8 wherein:

said high frequency long term test circuit includes a latch that is set when said pulse is passed by the gate of said high frequency long term test circuit;

said low frequency long term test circuit includes a latch that is set when said pulse is passed by the gate of said low frequency long term test circuit;

said DTMF digit timing circuit is connected to said high and low frequency long term test circuits so as to detect the setting of the latches of said high and low frequency long term test circuits, said DTMF digit timing circuit including means for producing a strobe signal when the latches of both of said high and low frequency long term test circuits are set; and, said output register and decoder is connected to said DTMF digit timing circuit so as to receive said strobe signal, said strobe signal causing said output register and decoder to read and decode said portions of said DTMF digital code produced by said high and low frequency short term test circuits.

10. A dial signal receiver as claimed in claim 9 wherein said DTMF digit timing circuit also includes means for producing a dual tone accept signal when said latches of said high and low frequency long term test circuits are both detected as set.

11. A dial signal receiver as claimed in claim 10 wherein said rotary dial subsystem comprises:

a loop current timer connected to receive said signal denoting the presence or absence of telephone line loop current, said loop current timer producing a series of timing signals, and series of timing signals starting anew each time an absence of loop current is first detected and each time restoration of loop current is first detected;

a rotary dial controller connected to receive the timing signals produced by said loop current timer and, based thereon, determine whether or not loop current break intervals and restoration intervals, denoted by the absence and presence of loop current, respectively, denote the receipt of a valid dial pulse train and, in accordance therewith, produce an output pulse for each valid rotary dial pulse contained in a rotary dial pulse train determined to be valid; and, a dial pulse counter connected to said rotary dial controller for counting the output pulses produced by said rotary dial controller, said dial pulse counter producing said rotary dial digital code applied to said output register and decoder.

12. A dial signal receiver as claimed in claim 11 wherein:

said rotary dial controller also produces a signal denoting the receipt of valid rotary dial pulses upon the receipt and detection of valid rotary pulses;

said DTMF digit timing circuit is connected to receive the signal produced by said rotary dial controller denoting the receipt of valid rotary dial pulses and, in accordance therewith, produce a strobe pulse identical to the strobe pulse produced when said latches of said high and low frequency long term counters are both detected as set;

said main controller includes means for producing a data selection signal in accordance with whether or not said DTMF subsystem is receiving high and low frequency components of a DTMF signal or said rotary dial subsystem is receiving a signal denoting the presence and absence of telephone line loop current, said data selection signal being applied to said output register and decoder;

said output register and decoder being conditioned by the data selection signal produced by said main controller so as to receive and store either said DTMF digital code or said rotary dial digital code depending upon the nature of said data selection signal; and, said strobe signal, produced by said DTMF digit timin circuit when said DTMF digit timing circuit receives a signal from said rotary dial controller denoting the receipt of a valid rotary dial pulse train or detects that the latches of said high and low frequency long term test circuits are both set, controlling the actual reading of a DTMF digital code or a rotay dial digital code by said output register and decoder.

13. A dial signal receiver as claimed in claim 1 wherein said high and low frequency short term frequency checks are continuously performed while said high and low frequency long term frequency checks are being performed.

14. A dial signal receiver as claimed in claim 13 wherein said DTMF subsystem is adapted to receive an early split control signal and, in accordance therewith, produce an early split output signal soon after a selected one of said high and low frequency components passes its first short term frequency check.

15. A dial signal receiver as claimed in claim 14 wherein said DTMF subsystem comprises:
a high frequency channel circuit for performing said short and long term frequency checks on the high frequency component of said DTMF telephone signal; and,
a low frequency channel circuit for performing said short and long term frequency checks on the low frequency component of said DTMF telephone signal.

16. A dial signal receiver as claimed in claim 15 wherein said high and low frequency channel circuits are cross connected such that the failure of either of said short and long term frequency checks by either of said high and low frequency components causes both of said high and low frequency channel circuits to be reset.

17. A dial signal receiver as claimed in claim 16 wherein:
said DTMF subsystem includes a DTMF digit timing circuit, said DTMF digit timing circuit adapted to receive said external early split control signal and a condition signal denoting the line split status of a related telephone and, if said condition signal denotes that said line is not split, produce a simulate two-cycle signal, said simulate two-cycle signal being applied to said high and low frequency channel circuits;
said high frequency channel circuit includes high fequency simulate means, responsive to said simulate two-cycle signal, for causing said high frequency channel circuit to operate in substantially the same manner as it would normally operate if an acceptable high frequency signal were being received, during the period of time said simulate two-cycle is being generated, regardless of the exact nature of any received high frequency component; and,
said low frequency channel circuit includes low frequency simulate means, resposive to said simulate two-cycle signal, for causing said low frequency channel circuit to operate in substantially the same manner as it would normally operate if an acceptable low frequency signal were being received, during the period of time said simulate two-cycle signal is being generated, regardless of the exact nature of any received low frequency component.

18. A dial signal receiver as claimed in claim 17 wherein:
(A) said high frequency channel circuit comprises:
(1) a high frequency two-cycle circuit suitable for receiving said high frequency components and, in accordance therewith, produce a high frequency pulse chain having a frequency equal to one-half the frequency of said high frequency component;
(2) a high frequency short term test circuit connected to said high frequency two-cycle circuit so as to receive said high frequency pulse train, continuously compare the intervals between adjacent pulses of said pulse train and produce a portion of said DTMF digital code as long as the intervals between said adjacent pulses remains the same, said portion of said DTMF digital code being related to the frequency of said high frequency component;
(3) a high frequency long term counter connected to said high frequency two-cycle circuit so as to receive said high frequency pulse train and produce a series of window control signals starting at predetermined intervals after the first pulse of a high frequency pulse train is received by said high frequency long term counter; and,
(4) a high frequency long term test circuit including a gate and a gate enabling subsystem, said gate enabling subsystem connected to said high frequency long term counter for receiving said window control signals and creating, in accordance therewith, a window enabling signal, said window enabling signal being related to the frequency of said high frequency pulse train, said window enabling signal applied to an enabling input of said gate, said gate also connected to said high frequency two-cycle circuit for receiving said high frequency pulse train, said gate passing a pulse of said high frequency pulse train if a pulse occurs during the period of time said gate is enabled by said window enabling signal, said pulse indicating that said high frequency component has passed both of said short and long term checks; and,
(B) said low frequency channel circuit comprises:
(1) a low frequency two-cycle circuit suitable for receiving said low frequency components and, in accordance therewith, produce a low frequency pulse chain having a frequency equal to one-half the frequency of said low frequency component;
(2) a low frequency short term test circuit connected to said low frequency two-cycle circuit so as to receive said low frequency pulse train, continuously compare the intervals between adjacent pulses of said pulse train and produce a portion of said DTMF digital code as long as the interval between said adjacent pulses remains the same, said portion of said DTMF digital code being related to the frequency of said low frequency component;
(3) a low frequency long term counter connected to said low frequency two-cycle circuit so as to receive said low frequency pulse train and produce a series of low frequency window control signals starting at predetermined intervals after the first pulse of said low frequency pulse train is received by said low frequency long term counter; and, (4) a low frequency long term test circuit including a gate and a gate enabling subsystem, said gate enabling subsystem connected to said low frequency long term counter for receiving said window control signals and creating, in accordance therewith, a window enabling signal, said window enabling signal being related to the frequency of said low frequency pulse train, said window enabling signal being applied to the enabling input of said gate, said gate also connected to said low frequency two-cycle circuit for receiving said low frequency pulse train, said gate passing a pulse of said low frequency pulse train if a pulse occurs during the period of time said gate is enabled by said window enabling signal, said pulse indicating that said low frequency component has passed both of said short and long term checks.

19. A dial signal receiver as claimed in claim 18 wherein:
said high frequency long term test circuit includes a latch that is set when said pulse is passed by the gate of said high frequency long term test circuit;
said low frequency long term test circuit includes a latch that is set when said pulse is passed by the gate of said low frequency long term test circuit;
said DTMF digit timing circuit is connected to said high and low frequency long term test circuits so as to detect the setting of the latches of said high and low frequency long term test circuits, said DTMF digit timing circuit including means for producing a strobe signal when the latches of both of said high and low frequency long term test circuits are set; and,
said output register and decoder is connected to said DTMF digit timing circuit so as to receive said strobe signal, said strobe signal causing said output register and decoder to read and decode said portions of said DTMF digital code produced by said high and low frequency short term test circuits.

20. A dial signal receiver as claimed in claim 19 wherein said DTMF digit timing circuit also includes means for producing a dual tone accept signal when said latches of said high and low frequency long term test circuits are both detected as set.

21. A dial signal receiver as claimed in claim 20 wherein said rotary dial subsystem comprises:
a loop current timer connected to receive said signal denoting the presence or absence of telephone line loop current, said loop current timer producing a series of timing signals, said series of timing signals starting anew each time as absence of loop current is first detected and each time restoration of loop current is first detected;
a rotary dial controller connected to receive the timing signals produced by said loop current timer and, based thereon, determine whether or not loop current break intervals and restoration intervals, denoted by the absence and presence of loop current, respectively, denote the receipt of a valid rotary dial pulse train and, in accordance therewith, produce an output pulse for each valid rotary dial pulse contained in a rotary dial pulse train determined to be valid; and,
a dial pulse counter connected to said rotary dial controller for counting the output pulses produced by said rotary dial controller, said dial pulse counter producing said rotary dial digital code applied to said output register and decoder.

22. A dial signal receiver as claimed in claim 21 wherein:
said rotary dial controller also produces a signal denoting the receipt of valid rotary dial pulses upon the receipt and detection of valid rotary dial pulses;
said DTMF digit timing circuit is connected to receive the signal produced by said rotary dial controller denoting the receipt of valid rotary dial pulses and, in accordance therewith, produce a strobe pulse identical to the strobe pulse produced when said latches of said high and low frequency long term counters are both detected as set;
said main controller includes means for producing a data selection signal in accordance with whether or not said DTMF subsystem is receiving high and low frequency components of a DTMF signal or said rotary dial subsystem is receiving a signal denoting the presence and absence of telephone line loop current, said data selection signal being applied to said output register and decoder;
said output register and decoder being conditioned by the data selection signal produced by said main controller so as to receive and store either said DTMF digital code or said rotary dial digital code depending upon the nature of said data selection signal; and,
said strobe signal, produced by said DTMF digit timing circuit when said DTMF digit timing circuit receives a signal from said rotary dial controller denoting the receipt of a valid rotary dial pulse train or detects that the latches of said high and low frequency long term test circuits are both set, controlling the actual reading of a DTMF digital code or a rotary dial digital code by said output register and decoder.

23. A dial signal receiver as claimed in claim 1 wherein said DTMF subsystem is adapted to receive an early split control signal and, in accordance therewith, produce an early split output signal soon after a selected one of said high and low frequency components passes its first short term frequency check.

24. A dial signal receiver as claimed in claim 23 wherein said DTMF subsystem comprises:
a high frequency channel circuit for performing said short and long term frequency checks on the high frequency component of said DTMF telephone signal; and,
a low frequency channel circuit for performing said short and long term frequency checks on the low frequency component of said DTMF telephone signal.

25. A dial signal receiver as claimed in claim 24 wherein said high and low frequency channel circuits are cross connected such that the failure of either of said short and long term frequency checks by either of said high and low frequency components causes both of said high and low frequency channel circuits to be reset.

26. A dial signal receiver as claimed in claim 25 wherein:
said DTMF susbsystem includes, a DTMF digit timing circuit, said DTMF digit timing circuit adapted to receive said external early split control signal and a condition signal denoting the line split status of a related telephone and, if said condition signal denotes that said line is not split, produce a simulate two-cycle signal, said simulate two-cycle signal being applied to said high and low frequency channel circuits;

said high frequency channel circuit includes high frequency simulate means, responsive to said simulate two-cycle signal, for causing said high frequency channel circuit to operate in substantially the same manner as it would normally operate if an acceptable high frequency signal were being received, during the period of time said simulate two-cycle is being generated, regardless of the exact nature of any received high frequency component; and, said low frequency channel circuit includes low frequency simulate means, responsive to said simulate two-cycle signal, for causing said low frequency channel circuit to operate in substantially the same manner as it would normally operate if an acceptable low frequency signal were being received, during the period of time said simulate two-cycle signal is being generated, regardless of the exact nature of any received low frequency component.

27. A dial signal receiver as claimed in claim 26 wherein:

(A) said high frequency channel circuit comprises:
(1) a high frequency two-cycle circuit suitable for receiving said high frequency components and, in accordance therewith, produce a high frequency pulse chain having a frequency equal to one-half the frequency of said high frequency component;
(2) a high frequency short term test circuit connected to said high frequency two-cycle circuit so as to receive said high frequency pulse train, continuously compare the intervals between adjacent pulses of said pulse train and produce a portion of said DTMF digital code as long as the intervals between said adjacent pulses remains the same, said portion of said DTMF digital code being related to the frequency of said high frequency component;
(3) a high frequency long term counter connected to said high frequency two-cycle circuit so as to receive said high frequency pulse train and produce a series of window control signals starting at predetermined intervals after the first pulse of a high frequency pulse train is received by said high frequency long term counter; and,
(4) a high frequency long term test circuit including a gate and a gate enabling subsystem, said gate enabling subsystem connected to said high frequency long term counter for receiving said window control signals and creating, in accordance therewith, a window enabling signal, said window enabling signal being related to the frequency of said high frequency pulse train, said window enabling signal applied to an enabling input of said gate, said gate also connected to said high frequency two-cycle circuit for receiving said high frequency pulse train, said gate passing a pulse of said high frequency pulse train if a pulse occurs during the period of time said gate is enabled by said window enabling signal, said pulse indicating that said high frequency component has passed both of said short and long term checks; and, (B) said low frequency channel circuit comprises:
(1) a low frequency two-cycle circuit suitable for receiving said low frequency components and, in accordance therewith, produce a low frequency pulse chain having a frequency equal to one-half the frequency of said low frequency component;
(2) a low frequency short term test circuit connected to said low frequency two-cycle circuit so as to receive said low frequency pulse train, continuously compare the intervals between adjacent pulses of said pulse train and produce a portion of said DTMF digital code as long as the interval between said adjacent pulses remains the same, said portion of said DTMF digital code being related to the frequency of said low frequency component;
(3) a low frequency long term counter connected to said low frequency two-cycle circuit so as to receive said low frequency pulse train and produce a series of low frequency window control signals starting at predetermined intervals after the first pulse of said low frequency pulse train is received by said low frequency long term counter; and,
(4) a low frequency long term test circuit including a gate and a gate enabling subsystem, said gate enabling subsystem connected to said low frequency long term counter for receiving said window control signals and creating, in accordance therewith, a window enabling signal, said window enabling signal being related to the frequency of said low frequency pulse train, said window enabling signal being applied to the enabling input of said gate, said gate also connected to said low frequency two-cycle circuit for receiving said low frequency pulse train, said gate passing a pulse of said low frequency pulse train if a pulse occurs during the period of time said gate is enabled by said window enabling signal, said pulse indicating that said low frequency component has passed both of said short and long term checks.

28. A dial signal receiver as claimed in claim 27 wherein:

said high frequency long term test circuit includes a latch that is set when said pulse is passed by the gate of said high frequency long term test circuit;

said low frequency long term test circuit includes a latch that is set when said pulse is passed by the gate of said low frequency long term test circuit;

said DTMF digit timing circuit is connected to said high and low frequency long term test circuits so as to detect the setting of the latches of said high and low frequency long term test circuits, said DTMF digit timing circuit including means for producing a strobe signal when the latches of both of said high and low frequency long term test circuits are set; and, said output register and decoder is connected to said DTMF digit timing circuit so as to receive said strobe signal, said strobe signal causing said output register and decoder to read and decode said portions of said DTMF digital code produced by said high and low frequency short term test circuits.

29. A dial signal receiver as claimed in claim 28 wherein said DTMF digit timing circuit also includes means for producing a dual tone accept signal when said latches of said high and low frequency long term circuits are both detected as set.

30. A dial signal receiver as claimed in claim 29 wherein said rotary dial subsystem comprises:

a loop current timer connected to receive said signal denoting the presence or absence of telephone line loop current, said loop current timer producing a series of timing signals, said series of timing signals starting anew each time an absence of loop current is first detected and each time restoration of loop current is first detected;

a rotary dial controller connected to receive the timing signals produced by said loop current timer and, based thereon, determine whether or not loop current break intervals and restoration intervals, denoted by the absence and presence of loop current, respectively, denote the receipt of a valid rotary dial pulse train and, in accordance therewith, produce an output pulse for each valid rotary dial pulse contained in a rotary dial pulse train determined to be valid; and, a dial pulse counter connected to said rotary dial controller for counting the output pulses produced by said rotary dial controller, said dial pulse counter producing said rotary dial digital code applied to said output register and decoder.

31. A dial signal receiver as claimed in claim 30 wherein:

said rotary dial controller also produces a signal denoting the receipt of valid rotary dial pulses upon the receipt and detection of valid rotary dial pulses;

said DTMF digit timing circuit is connected to receive the signal produced by said rotary dial controller denoting the receipt of valid rotary dial pulses and, in accordance therewith, produce a strobe pulse identical to the strobe pulse produced when said latches of said high and low frequency long term counters are both detected as set;

said main controller includes means for producing a data selection signal in accordance with whether or not said DTMF subsystem is receiving high and low frequency components of a DTMF signal or said rotary dial subsystem is receiving a signal denoting the presence and absence of telephone line loop current, said signal data selection signal being applied to said output register and decoder;

said output register and decoder being conditioned by the data selection signal produced by said main controller so as to receive and store either said DTMF digital code or said rotary dial digital code depending upon the nature of said data selection signal; and, said strobe signal, produced by said DTMF digit timing circuit when said DTMF digit timing circuit receives a signal from said rotary dial controller denoting the receipt of a valid rotary dial pulse train or detects that the latches of said high and low frequency long term test circuits are both set, controlling the actual reading of a DTMF digital code or a rotary dial digital code by said output register and decoder.

32. A dial signal receiver as claimed in claim 1 wherein said DTMF subsystem comprises:

a high frequency channel circuit for performing said short and long term frequency checks on the high frequency component of said DTMF telephone signal; and, a low frequency channel circuit for performing said short and long term frequency checks on the low frequency component of said DTMF telephone signal.

33. A dial signal receiver as claimed in claim 32 wherein said high and low frequency channel circuits are cross connected such that the failure of either of said short and long term frequency checks by either of said high and low frequency components causes both of said high and low frequency channel circuits to be reset.

34. A dial signal receiver as claimed in claim 33 wherein:

said DTMF susbsystem includes a DTMF digit timing circuit, said DTMF digit timing circuit adapted to receive said external early split control signal and a condition signal denoting the line split status of a related telephone and, if said condition signal denotes that said line is not split, produce a simulate two-cycle signal, said simulate two-cycle signal being applied to said high and low frequency channel circuits;

said high frequency channel circuit includes high frequency simulate means, responsive to said simulate two-cycle signal, for causing said high frequency channel circuit to operate in substantially the same manner as it would normally operate if an acceptable high frequency signal were being received, during the period of time said simulate two-cycle is being generated, regardless of the exact nature of any received high frequency component; and, said low frequency channel circuit includes low frequency simulate means, responsive to said simulate two-cycle signal, for causing said low frequency channel circuit to operate in substantially the same manner as it would normally operate if an acceptable low frequency signal were being received, during the period of time said simulate two-cycle signal is being generated, regardless of the exact nature of any received low frequency component.

35. A dial signal receiver as claimed in claim 34 wherein:

(A) said high frequency channel circuit comprises:

(1) a high frequency two-cycle circuit suitable for receiving said high frequency components and, in accordance therewith, produce a high frequency pulse chain having a frequency equal to one-half the frequency of said high frequency component;

(2) a high frequency short term test circuit connected to said high frequency two-cycle circuit so as to receive said high frequency pulse train, continuously compare the intervals between adjacent pulses of said pulse train and produce a portion of said DTMF digital code as long as the intervals between said adjacent pulses remains the same, said portion of said DTMF digital code being related to the frequency of said high frequency component;

(3) a high frequency long term counter connected to said high frequency two-cycle circuit so as to receive said high frequency pulse train and produce a series of window control signals starting at predetermined intervals after the first pulse of a high frequency pulse train is received by said high frequency long term counter; and, (4) a high frequency long term test circuit including a gate and a gate enabling subsystem, said gate enabling subsystem connected to said high frequency long term counter for receiving said window control signals and creating, in accordance therewith, a window enabling signal, said window enabling signal being related to the frequency of said high frequency pulse train, said window enabling signal applied to an enabling input of said gate, said gate also connected to said high frequency two-cycle circuit for receiving said high frequency pulse train, said gate passing a pulse of said high frequency pulse train if a pulse occurs during the period of time said gate is enabled by said window enabling signal, said pulse indicating that said high frequency component has passed both of said short and long term checks; and, (B) said low frequency channel circuit comprises:
(1) a low frequency two-cycle circuit suitable for receiving said low frequency components and, in accordance therewith, produce a low frequency pulse chain having a frequency equal to one-half the frequency of said low frequency component;
(2) a low frequency short term test circuit connected to said low frequency two-cycle circuit so as to receive said low frequency pulse train, continuously compare the intervals between adjacent pulses of said pulse train and produce a portion of said DTMF digital code as long as the interval between said adjacent pulses remains the same, said portion of said DTMF digital code being related to the frequency of said low frequency component;
(3) a low frequency long term counter connected to said low frequency two-cycle circuit so as to receive said low frequency pulse train and produce a series of low frequency window control signals starting at predetermined intervals after the first pulse of said low frequency pulse train is received by said low frequency long term counter; and,
(4) a low frequency long term test circuit including a gate and a gate enabling subsystem, said gate enabling subsystem connected to said low frequency long term counter for receiving said window control signals and creating, in accordance therewith, a window enabling signal, said window enabling signal being related to the frequency of said low frequency pulse train, said window enabling signal being applied to the enabling input of said gate, said gate also connected to said low frequency two-cycle circuit for receiving said low frequency pulse train, said gate passing a pulse of said low frequency pulse train if a pulse occurs during the period of time said gate is enabled by said window enabling signal, said pulse indicating that said low frequency component has passed both of said short and long term checks.

36. A dial signal receiver as claimed in claim 35 wherein:
said high frequency long term test circuit includes a latch that is set when said pulse is passed by the gate of said high frequency long term test circuit;
said low frequency long term test circuit includes a latch that is set when said pulse is passed by the gate of said low frequency long term test circuit;
said DTMF digit timing circuit is connected to said high and low frequency long term test circuits so as to detect the setting of the latches of said high and low frequency long term test circuits, said DTMF digit timing circuit including means for producing a strobe signal when the latches of both of said high and low frequency long term test circuits are set; and,
said output register and decoder is connected to said DTMF digit timing circuit so as to receive said strobe signal, said strobe signal causing said output register and decoder to read and decode said portions of said DTMF digital code produced by said high and low frequency short term test circuits.

37. A dial signal receiver as claimed in claim 36 wherein said DTMF digit timing circuit also includes means for producing a dual tone accept signal when said latches of said high and low frequency long term test circuits are both detected as set.

38. A dial signal receiver as claimed in claim 37 wherein said rotary dial subsystem comprises:
a loop current timer connected to receive said signal denoting the presence or absence of telephone line loop current, said loop current timer producing a series of timing signals, said series of timing signals starting anew each time an absence of loop current is first detected and each time restoration of loop current is first detected;
a rotary dial controller connected to receive the timing signals produced by said loop current timer and, based thereon, determine whether or not loop current break intervals and restoration intervals, denoted by the absence and presence of loop current, respectively, denote the receipt of a valid rotary dial pulse train and, in accordance therewith, produce an output pulse for each valid rotary dial pulse contained in a rotary dial pulse train determined to be valid; and,
a dial pulse counter connected to said rotary dial controller for counting the output pulses produced by said rotary dial controller, said dial pulse counter producing said rotary dial digital code applied to said output register and decoder.

39. A dial signal receiver as claimed in claim 38 wherein:
said rotary dial controller also produces a signal denoting the receipt of valid rotary dial pulses upon the receipt and detection of valid rotary dial pulses;
said DTMF digit timing circuit is connected to receive the signal produced by said rotary dial controller denoting the receipt of valid rotary dial pulses and, in accordance therewith, produce a strobe pulse identical to the strobe pulse produced when said latches of said high and low frequency long term counters are both detected as set;
said main controller includes means for producing a data selection signal in accordance with whether or not said DTMF subsystem is receiving high and low frequency components of a DTMF signal or said rotary dial subsystem is receiving a signal denoting the presence and absence of telephone line loop current, said signal data selection signal being applied to said output register and decoder;
said output register and decoder being conditioned by the data selection signal produced by said main controller so as to receive and store either said DTMF digital code or said rotary dial digital code depending upon the nature of said data selection signal; and,
said strobe signal, produced by said DTMF digit timing circuit when said DTMF digit timing circuit receives a signal from said rotary dial controller denoting the receipt of a valid rotary dial pulse train or detects that the latches of said high and low frequency long term test circuits are both set, controlling the actual reading of a DTMF digital code or a rotary dial digital code by said output register and decoder.

40. A dial signal receiver as claimed in claim 1 wherein said rotary dial subsystem comprises:
a loop current timer connected to receive said signal denoting the presence or absence of telephone line loop current, said loop current timer producing a series of timing signals, said series of timing signals starting anew each time an absence of loop current is first detected and each time restoration of loop current is first detected;

a rotary dial controller connected to receive the timing signals produced by said loop current timer and, based thereon, determine whether or not loop current break intervals and restoration intervals, denoted by the absence and presence of loop current, respectively, denote the receipt of a valid rotary dial pulse train and, in accordance therewith, produce an output pulse for each valid rotary dial pulse contained in a rotary dial pulse train determined to be valid; and, a dial pulse counter connected to said rotary dial controller for counting the output pulses produced by said rotary dial controller, said dial pulse counter producing said rotary dial digital code applied to said output register and decoder.

41. A dial signal receiver as claimed in claim 40 wherein:

said rotary dial controller also produces a signal denoting the receipt of valid rotary dial pulses upon the receipt and detection of valid rotary dial pulses;

said DTMF subsystem includes a DTMF digit timing circuit connected to receive the signal produced by said rotary dial controller denoting the receipt of valid rotary dial pulses and, in accordance therewith, produce a strobe pulse; and, said output register and decoder is connected to said DTMF digit timing circuit so as to receive said strobe signal, said strobe signal enabling said output register and decoder to read and decode said rotary dial digital code produced by said dial pulse counter.

42. A dial signal receiver as claimed in claim 41 wherein said output register and decoder is adapted to receive external format control signals, said external format control signals controlling the format of said output digital code.

43. A dial signal receiver as claimed in claim 40 wherein said output register and decoder is adapted to receive external format control signals, said external format control signals controlling the format of said output digital code.

44. A dial signal receiver for receiving and detecting multiple frequency signals including at least two discrete components, said dial signal receiver comprising:

a first frequency channel circuit for performing independent short and long term frequency checks on a first frequency component of said multiple frequency signal; and, a second frequency channel circuit for performing independent short and long term frequency checks on a second frequency component of said multiple frequency signal, said first and second channel circuits being cross connected such that the failure of either of said short and long term frequency checks by either of said first and second frequency components causes both of said first and second frequency channel circuits to be reset, said first and second frequency channel circuits producing an output signal denoting the receipt of a valid multiple frequency signal only if said first and second frequency components of said multiple frequency signal pass both of said short and long term frequency checks.

45. A dial signal receiver as claimed in claim 44 wherein:

(A) said first frequency channel circuit comprises:

(1) a first frequency pulse circuit suitable for receiving said first frequency components and, in accordance therewith, produce a first frequency pulse chain having a frequency related to the frequency of said first frequency component;

(2) a first frequency short term test circuit connected to said first frequency pulse circuit so as to receive said first frequency pulse train, continuously compare the intervals between adjacent pulses of said pulse train and produce a portion of a frequency digital code as long as the intervals between said adjacent pulses remains the same, said portion of said frequency digital code being related to the frequency of said first frequency component;

(3) a first frequency long term counter connected to said first frequency pulse circuit so as to receive said first frequency pulse train and produce a series of window control signals starting at predetermined intervals after the first pulse of a first frequency pulse train is received by said first frequency long term counter; and, (4) a first frequency long term test circuit including a gate and a gate enabling subsystem, said gate enabling subsystem connected to said first frequency long term counter for receiving said window control signals and creating, in accordance therewith, a window enabling signal, said window enabling signal being related to the frequency of said first frequency pulse train, said window enabling signal applied to an enabling input of said gate, said gate also connected to said first frequency pulse circuit for receiving said first frequency pulse train, said gate passing a pulse of said first frequency pulse train if a pulse occurs during the period of time said gate is enabled by said window enabling signal, said pulse indicating that said first frequency component has passed both of said short and long term checks; and, (B) said second frequency channel circuit comprises:

(1) a second frequency pulse circuit suitable for receiving said second frequency components and, in accordance therewith, produce a second frequency pulse chain having a frequency related to the frequency of said second frequency component;

(2) a second frequency short term test circuit connected to said second frequency pulse circuit so as to receive said second frequency pulse train, continuously compare the intervals between adjacent pulses of said pulse train and produce a portion of a frequency digital code as long as the interval between said adjacent pulses remains the same, said portion of said frequency digital code being related to the frequency of said second frequency component;

(3) a second frequency long term counter connected to said second frequency pulse circuit so as to receive said second frequency pulse train and produce a series of second frequency window control signals starting at predetermined intervals after the first pulse of said second frequency pulse train is received by said second frequency long term counter; and, (4) a second frequency long term test circuit including a gate and a gate enabling subsystem, said gate enabling subsystem connected to said second frequency long term counter for receiving said window control signals and creating, in accordance therewith, a window enabling signal, said window enabling signal being related to the frequency of said second frequency pulse train, said window enabling signal being applied to the enabling input of said gate, said gate also connected to said second frequency pulse circuit for receiving said second frequency pulse train, said gate passing a pulse of said second frequency pulse train if a pulse occurs during the period of time said gate is enabled by said window enabling signal, said pulse indicating that said second frequency component has passed both of said short and long term checks.

* * * * *